(12) United States Patent
Takeda et al.

(10) Patent No.: US 12,108,419 B2
(45) Date of Patent: Oct. 1, 2024

(54) HYBRID AUTOMATIC REPEAT REQUEST ACKNOWLEDGMENT FOR MULTIPLE MULTICAST TRANSMISSIONS

(71) Applicant: QUALCOMM Incorporated, San Diego, CA (US)

(72) Inventors: Kazuki Takeda, Tokyo (JP); Le Liu, San Jose, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 17/646,980

(22) Filed: Jan. 4, 2022

(65) Prior Publication Data

US 2022/0322292 A1    Oct. 6, 2022

Related U.S. Application Data

(60) Provisional application No. 63/200,923, filed on Apr. 2, 2021.

(51) Int. Cl.
| | |
|---|---|
| *H04W 72/30* | (2023.01) |
| *H04L 5/00* | (2006.01) |
| *H04W 72/02* | (2009.01) |
| *H04W 72/20* | (2023.01) |
| *H04W 72/23* | (2023.01) |

(52) U.S. Cl.
CPC ........... *H04W 72/30* (2023.01); *H04L 5/0053* (2013.01); *H04W 72/02* (2013.01); *H04W 72/20* (2023.01); *H04W 72/23* (2023.01)

(58) Field of Classification Search
CPC ..... H04W 72/30; H04W 72/02; H04W 72/20; H04W 72/23; H04W 28/04; H04L 5/0053; H04L 5/0055; H04L 2001/0093; H04L 1/1861; H04L 1/1671; H04L 1/1854
See application file for complete search history.

(56) References Cited

U.S. PATENT DOCUMENTS

2018/0152274 A1* 5/2018 Li ..................... H04W 28/04
2022/0264612 A1* 8/2022 Yang ................. H04W 72/1273

OTHER PUBLICATIONS

International Search Report and Written Opinion dated Jun. 7, 2022 from corresponding PCT Application No. PCT/US2022/070712.

(Continued)

*Primary Examiner* — Dady Chery
(74) *Attorney, Agent, or Firm* — Arent Fox, LLP

(57) ABSTRACT

Support for hybrid automatic repeat request acknowledgment feedback for multiple multicast services in 5G new radio (NR) is provided. Resource allocation techniques are provided to allocate uplink control channel resource for acknowledgment of downlink multicast data transmissions associated with one or more multicast services. An apparatus, such a user equipment (UE), receives multicast data associated with one or more multicast services from a base station. The apparatus determines an uplink resource, such as a physical uplink control channel (PUCCH) resource, for transmitting multicast acknowledgement feedback, such as positive acknowledgement (ACK)/negative acknowledgement (NACK) feedback, in response to the received multicast data. The apparatus transmits the acknowledgement feedback for the one or more multicast services to the base station in the determined uplink resource.

30 Claims, 17 Drawing Sheets

(56) References Cited

OTHER PUBLICATIONS

CATT: "Discussion on reliability improvement mechanism for RRC_Connected 22-24, UEs in MBS", 3GPP Draft; R1-2100355, 3rd Generation Partnership Project (3GPP), Mobile Competence Centre ; 650, Route Des Lucioles ; F-06921 Sophia-Antipolis Cedex; France, vol. RAN WG1, No. e-Meeting; Jan. 25, 2020-Feb. 5, 2020 Jan. 19, 2021 (Jan. 19, 2021), XP051970958, Retrieved from the Internet: URL:https://ftp.3gpp.org/tsg_ran/WG1_RL1/TSGR1_104-e/Docs/RI-2100355.zip R1-2100355.docx [retrieved on Jan. 19, 2021].
CMCC: "Discussion on reliability improvement", 3GPP Draft; RI12101064, 3rd Generation Partnership Project (3GPP), Mobile Competence Centre; 650, Route Des Lucioles; F-06921 Sophia-Antipolis Cedex; France vol. RAN WG1, No. e-Meeting; Jan. 25, 2021-Feb. 5, 2021 Jan. 18, 2021 (Jan. 18, 2021), XP051970643, Retrieved from the Internet: URL:https://ftp.3gpp.org/tsg_ran/WG1_RL1/TSGR1_104-e/Docs/ R1-2101064.zip RI12101064.docx [retrieved on Jan. 18, 2021].
Moderator (Huawei): "FL summary #5 on improving reliability for MBS for RRC_Connected UEs", 3GPP Draft; R1-2102134, 3rd Generation Partnership Project (3GPP), Mobile Competence Centre; 650, Route Des Lucioles; F-06921 Sophia-Antipolis Cedex; France vol. RAN WGI1 No. E-meeting; Jan. 25, 2021-Feb. 5, 2021 Feb. 4, 2021 (Feb. 4, 2021), XP051976094, Retrieved from the Internet: URL:https://ftp.3gpp.org/tsg_ran/WG1_RL1/TSGR1_104-e/Inbox/RI-2102134.zip R1-2102134.docx [retrieved on Feb. 4, 2021].

\* cited by examiner

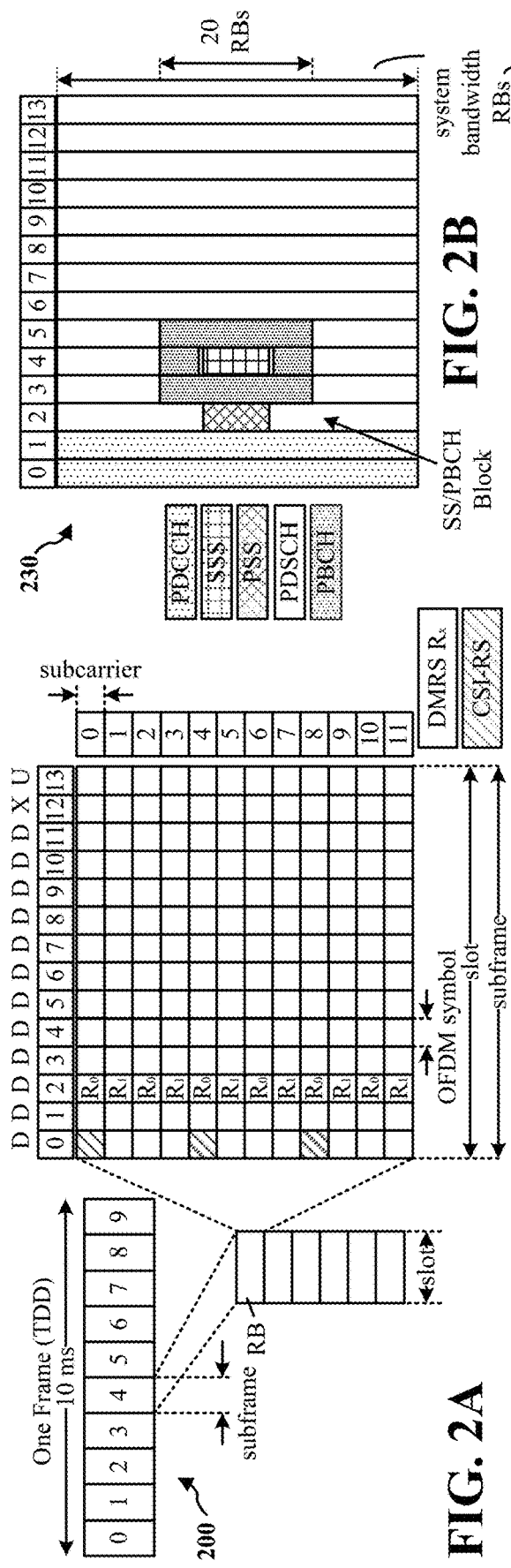
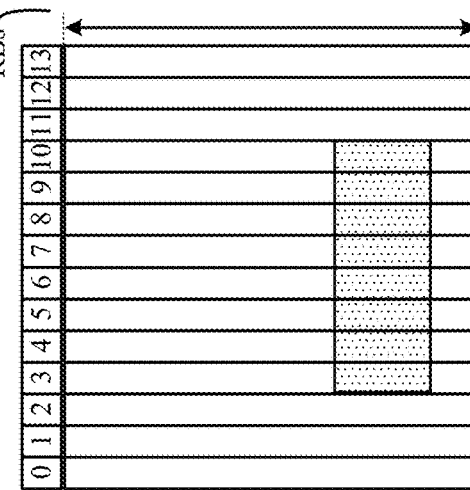
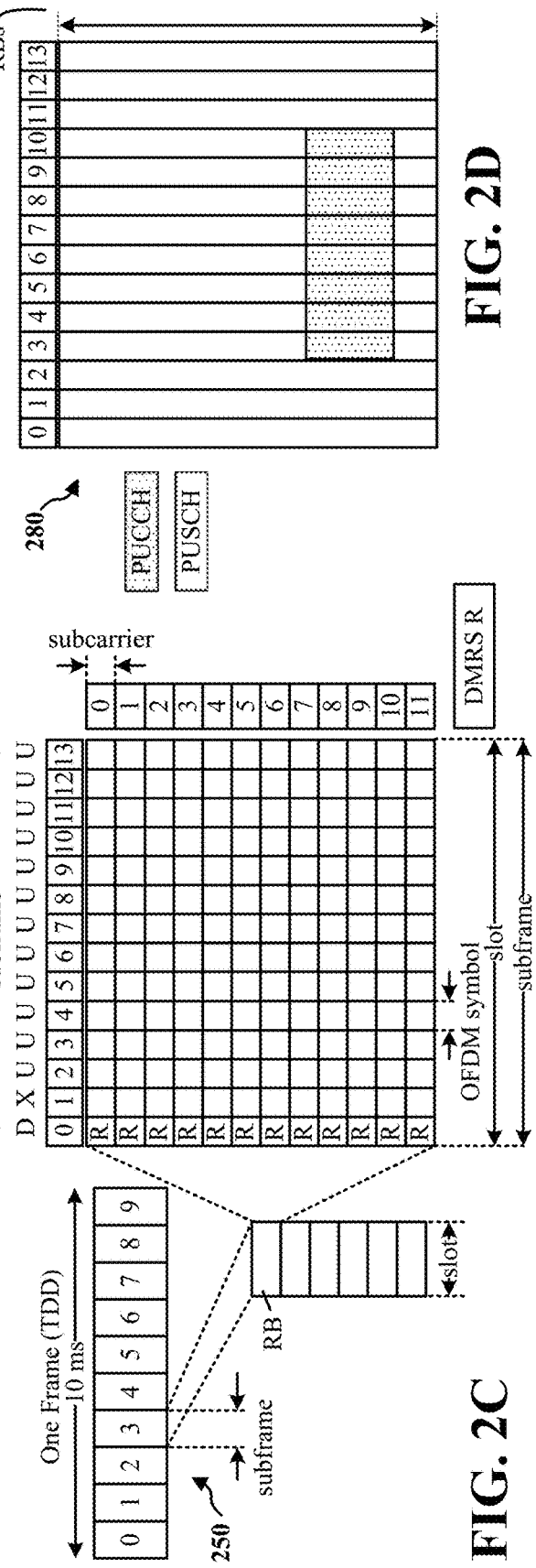
FIG. 2A  FIG. 2B  FIG. 2C  FIG. 2D

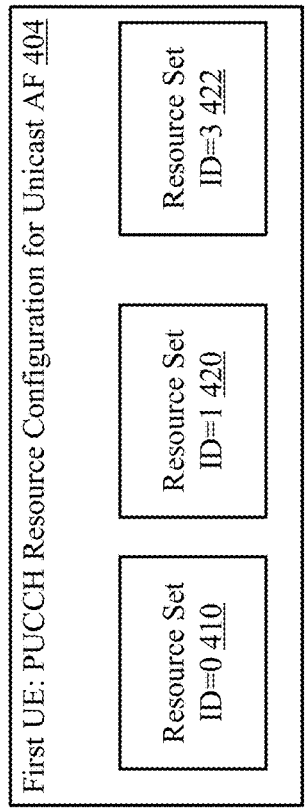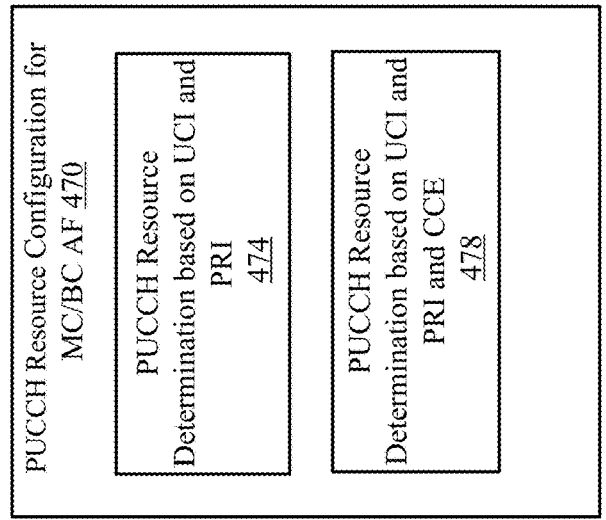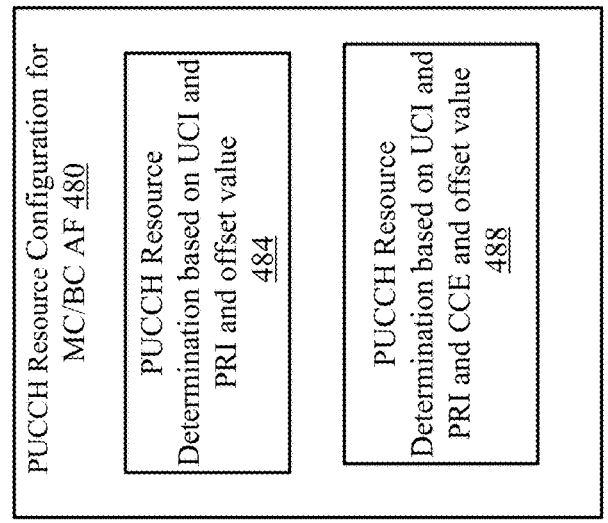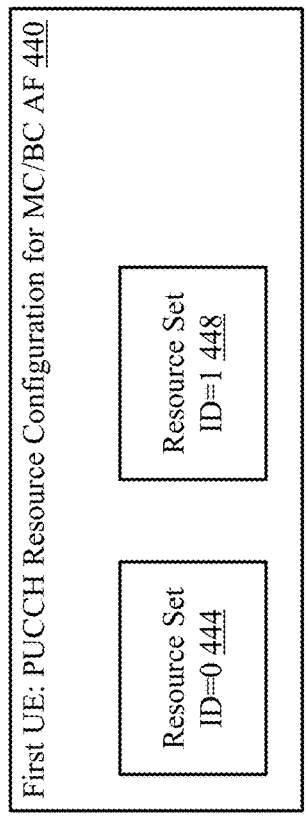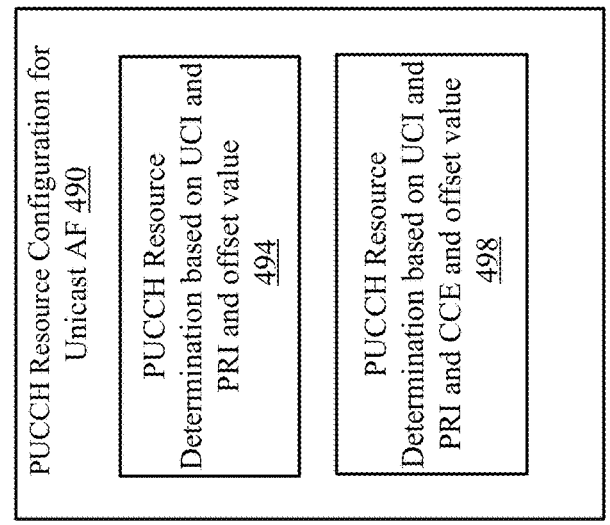
FIG. 4

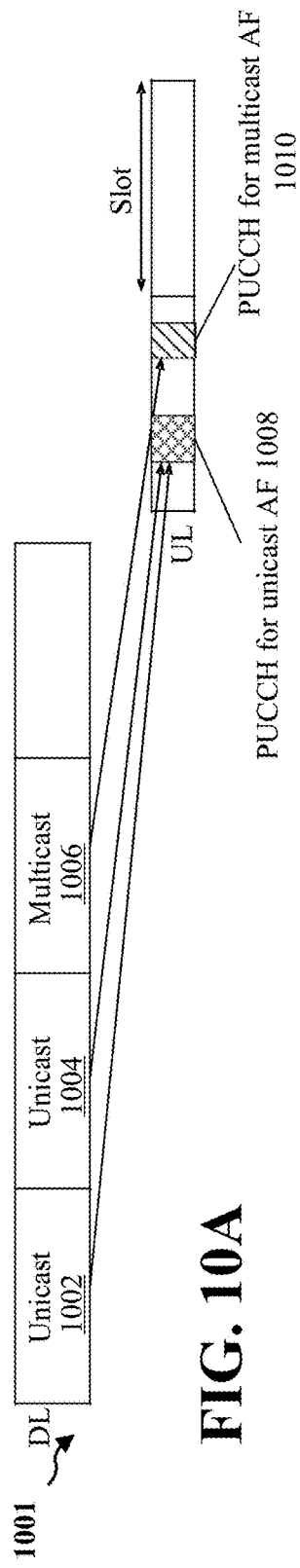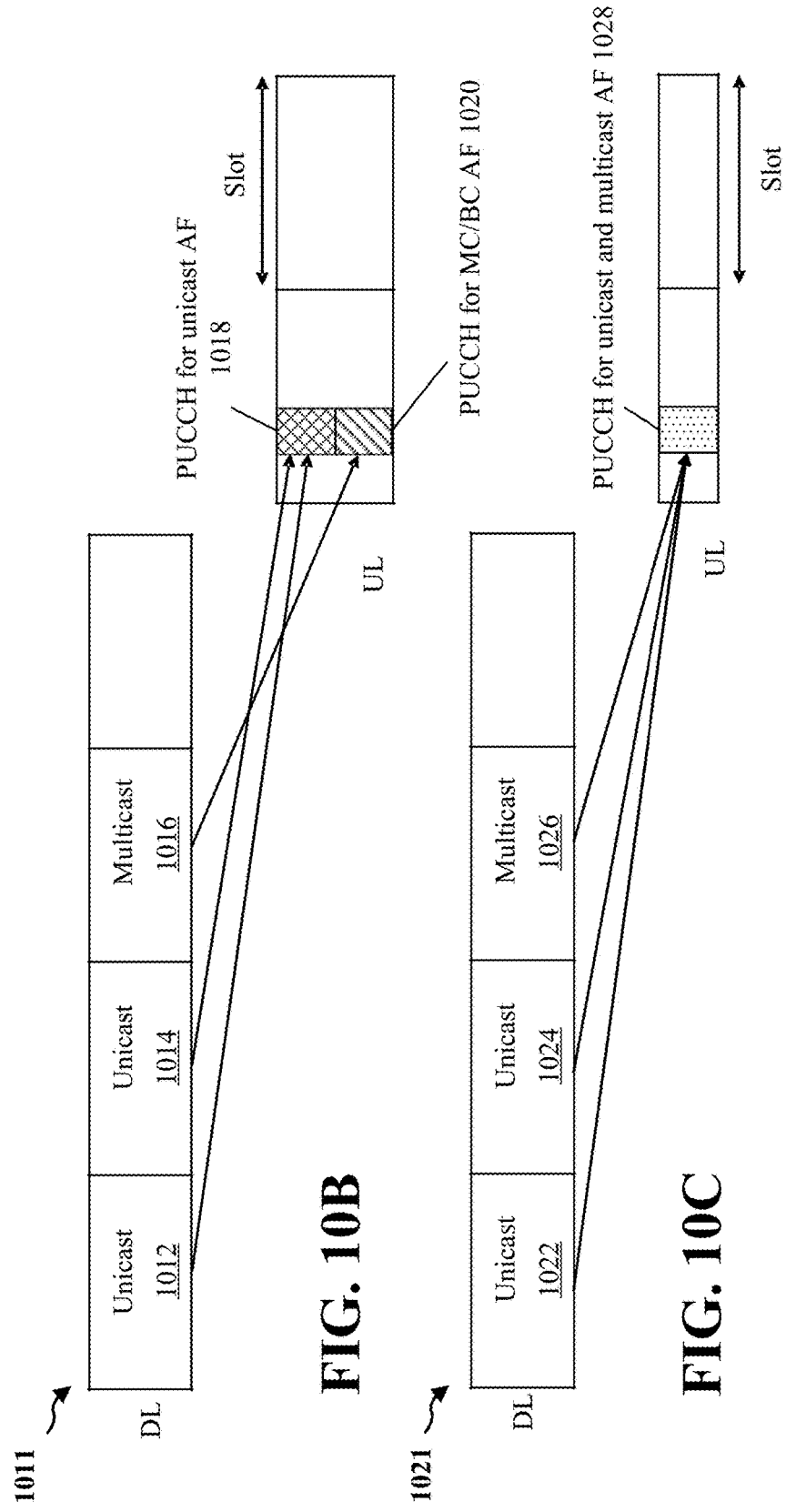
FIG. 10A
FIG. 10B
FIG. 10C

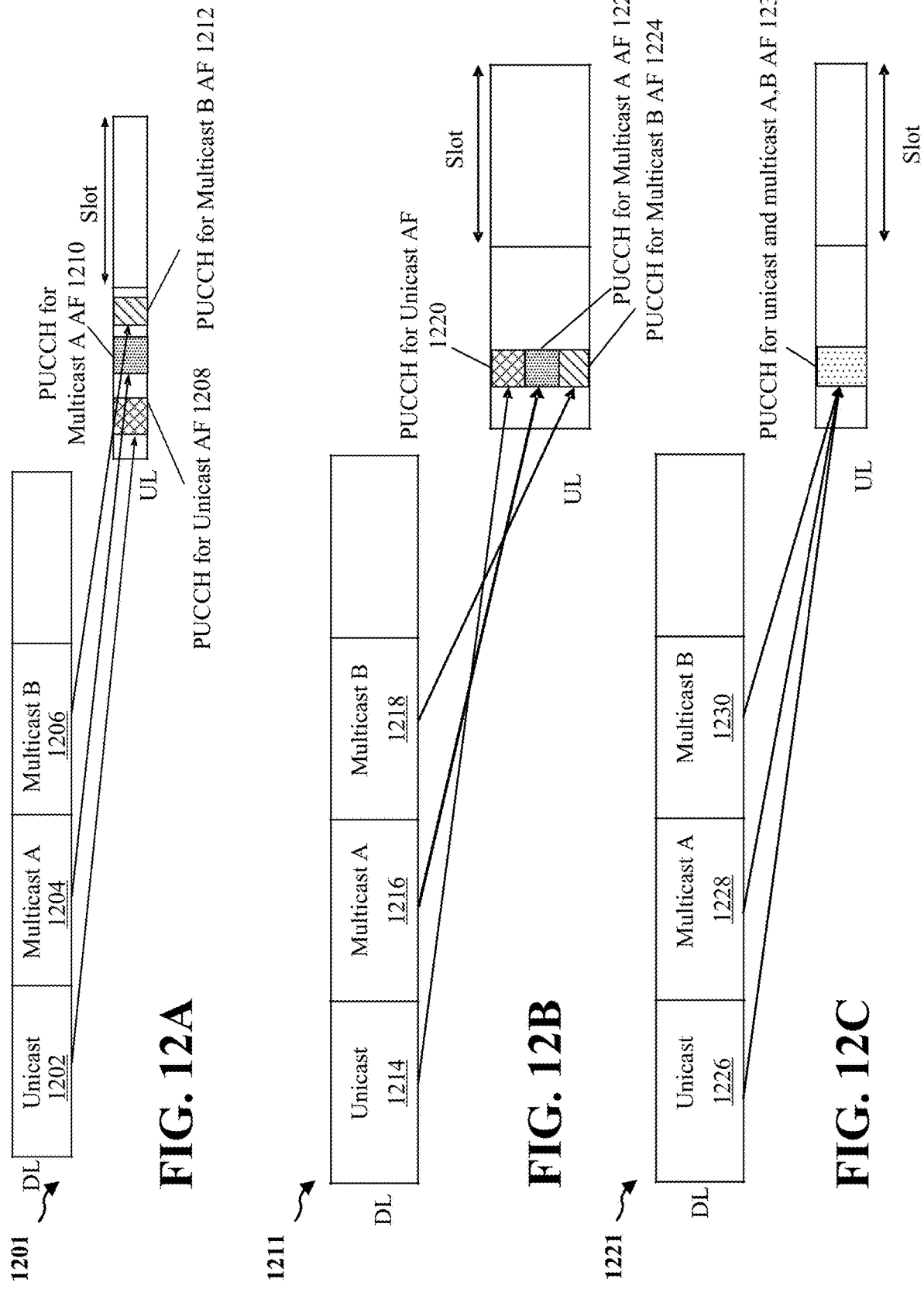

HYBRID AUTOMATIC REPEAT REQUEST ACKNOWLEDGMENT FOR MULTIPLE MULTICAST TRANSMISSIONS

CROSS REFERENCE TO RELATED APPLICATION(S)

This application claims the benefit of U.S. Provisional Patent Application Ser. No. 63/200,923, entitled "HYBRID AUTOMATIC REPEAT REQUEST ACKNOWLEDGMENT FOR MULTIPLE MULTICAST TRANSMISSIONS" and filed on Apr. 2, 2021, which is expressly incorporated by reference herein in its entirety.

TECHNICAL FIELD

The present disclosure relates generally to communication systems, and more particularly, to hybrid automatic repeat request (HARQ)-acknowledgment (ACK) for multiple multicast transmissions.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low-latency communications (URLLC).

For 5G NR, support for multiple multicast transmissions has been proposed. In addition, unlike in LTE MC/BC transmissions, where acknowledgement feedback was not supported, 5G NR is exploring the use of acknowledgement feedback of multiple multicast transmissions in order to improve efficiency and reliability. There remains a need for new techniques in 5G NR technology to allocate uplink control channel resource(s) for acknowledgement of downlink multicast data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Resource allocation techniques are provided to allocate uplink control channel resource for acknowledgement of downlink multicast data transmissions.

In an aspect of the disclosure, a method, a computer-readable medium, and an apparatus are provided. An apparatus, such as a user equipment (UE), receives multicast data associated with one or more multicast services from a base station. The apparatus determines a physical uplink control channel (PUCCH) resource to transmit multicast acknowledgement (ACK)/negative acknowledgement (NACK) feedback for the one or more multicast services in response to the received multicast data. The apparatus transmits the multicast ACK/NACK feedback to the base station in the determined PUCCH resource.

In another aspect of the disclosure, a method, a computer-readable medium, and an apparatus are provided. An apparatus, such as a UE, receives multicast data associated with one or more multicast services from a base station. The apparatus selects a PUCCH resource set from a plurality of PUCCH resource sets based at least in part on a number of bits in a UCI, the selected PUCCH resource set comprising a plurality of PUCCH resources. The apparatus selects at least one PUCCH resource from the selected PUCCH resource set based at least in part on a PRI. The apparatus transmits multicast ACK/NACK feedback for each of the one or more multicast services to the base station in the selected at least one PUCCH resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, downlink (DL) channels within a 5G/NR subframe, a second 5G/NR frame, and uplink (UL) channels within a 5G/NR subframe, respectively.

FIG. 4 illustrates physical uplink control channel (PUCCH) resource configurations and resource determination techniques according to some implementations.

FIG. 10A is a diagram illustrating a time division multiplexed (TDM) unicast AF and MC/BC AF according to some implementations.

FIG. 10B is a diagram illustrating a frequency division multiplexed (FDM) unicast AF and MC/BC AF according to some implementations.

FIG. 10C is a diagram illustrating a codebook multiplexed (CDM) unicast AF and MC/BC AF according to some implementations.

FIG. 11A is a diagram illustrating a time division multiplexed (TDM) multicast AF for different multiple multicast services according to some implementations.

FIG. 11B is a diagram illustrating a frequency division multiplexed (FDM) multicast AF for different multiple multicast services according to some implementations.

FIG. 11C is a diagram illustrating a codebook multiplexed (CDM) multicast AF for different multiple multicast services according to some implementations.

FIG. 12A is a diagram illustrating a time division multiplexed (TDM) unicast AF and MC/BC AF for different multiple multicast services according to some implementations.

FIG. 12B is a diagram illustrating a frequency division multiplexed (FDM) unicast AF and MC/BC AF for different multiple multicast services according to some implementations.

FIG. 12C is a diagram illustrating a codebook multiplexed (CDM) unicast AF and MC/BC AF for different multiple multicast services according to some implementations.

DETAILED DESCRIPTION

Figure 1:
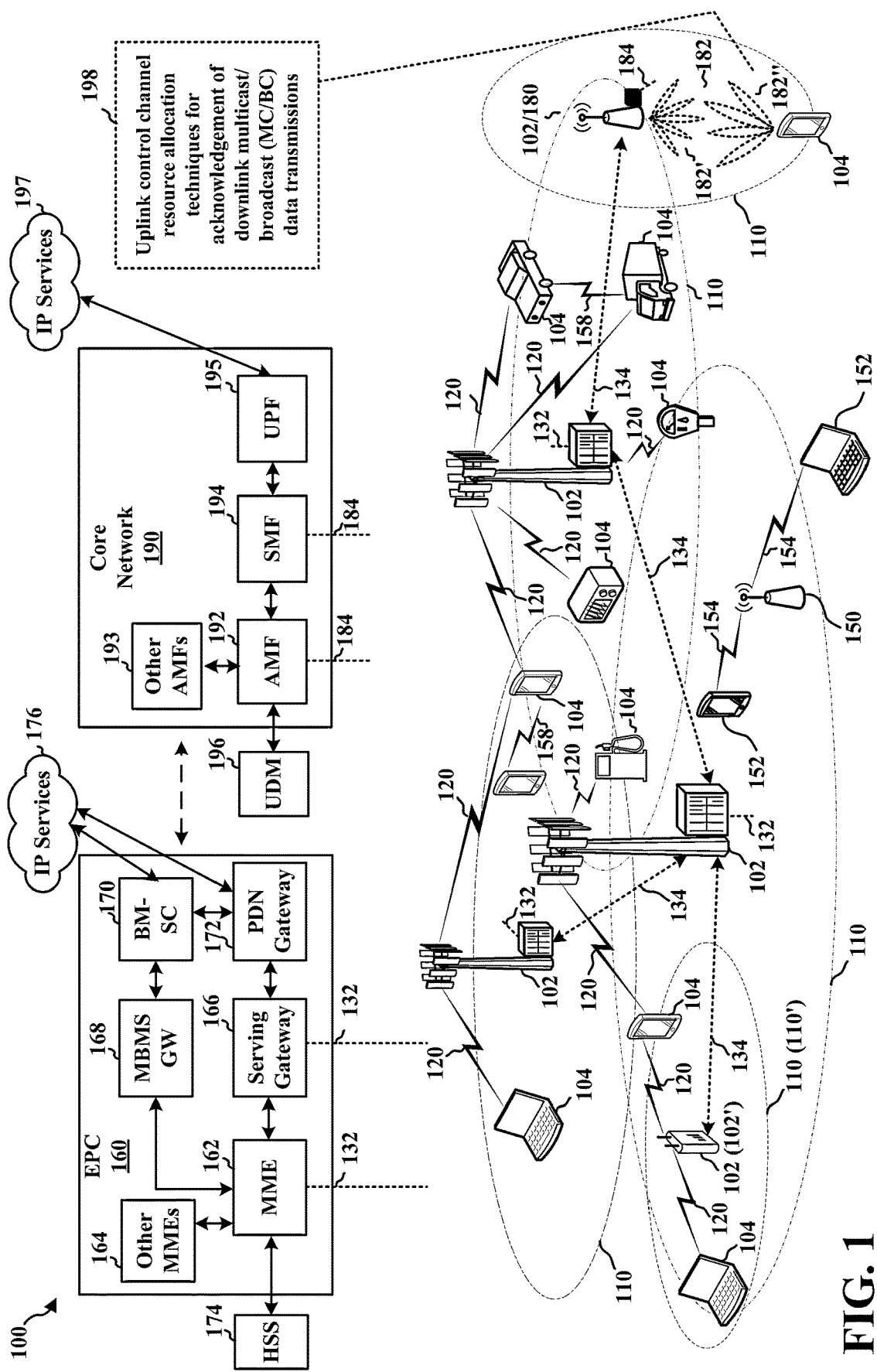
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to uplink control channel resource allocation techniques for acknowledgement of downlink multicast transmissions associated with one or more multicast services. Upon receiving multicast data from a base station, a UE acknowledges the receipt of the multicast data by sending multicast HARQ-ACK feedback. In some implementations, the UE determines physical uplink control channel (PUCCH) resources to use in sending ACK/NACK feedback (AF) to the base station.

In the present disclosure, the HARQ-ACK feedback can include a positive acknowledgement (ACK) or a negative acknowledgement (NACK). The term "acknowledgement" may be terminology that is known to one of ordinary skill in the art. In 5G NR, support for "NACK-only" feedback may be provided for non-acknowledgment of downlink multicast transmissions. For example, if a UE fails to decode downlink multicast data, the UE may transmit a NACK feedback to the network using a HARQ-ACK bit. Otherwise, the UE may not transmit anything back to the network. The subject technology may be equally applicable to "ACK/NACK feedback" and "NACK-only feedback". In both use cases, a PUCCH resource is selected and the HARQ-ACK bit representing the ACK/NACK feedback or the NACK-only feedback is transmitted. Although the terms "AF" and "MC/BC Acknowledgement" can refer to "ACK/NACK feedback," the terms ACK/NACK feedback (or AF) and MC/BC Acknowledgment are still valid and applicable even if the HARQ-ACK feedback for MC/BC is "NACK-only feedback."

One technique for determining or allocating PUCCH resources for multicast AF is to have the base station indicate through RRC a first configuration of PUCCH resources for use in multicast AF for a first multicast service and through another RRC a second configuration of PUCCH resources for use in sending multicast AF for a second multicast service (or different multicast service). One advantage of this first technique is that the multicast AF corresponding to the first multicast service is not pre-empted by the multicast AF corresponding to the second multicast service because the first configuration of resources is independent from the second configuration of resources.

The first and second configurations of resources include two or more resource sets that each include two or more PUCCH resources. The UE determines a particular resource set from among the resource sets and then determines one or more PUCCH resources in the determined resource set based at least in part on various parameters.

In some implementations, once the UE determines a PUCCH resource (identified by an identifier) from the first configuration of resources, the UE applies an offset value to the identifier of the PUCCH resource to determine an identifier for a final PUCCH resource to use for the multicast AF corresponding to a first multicast service. In some other implementations, once the UE determines a PUCCH resource (identified by an identifier) from the second configuration of resources, the UE applies an offset value to the identifier of the PUCCH resource to determine an identifier for a final PUCCH resource to use for the multicast AF corresponding to a second multicast service.

A second technique for determining or allocating PUCCH resources for multiple multicast AF is to have the multicast AF corresponding to a first multicast service and the multicast AF corresponding to a second multicast service share uplink resources. For example, the UE can use a time division multiplex scheme, a frequency multiplex scheme or a codebook multiplex scheme to send multiple multicast AF to the base station in a concurrent manner. One advantage of this second technique is that multicast AF for multiple multicast services may be sent to the base station in the same slot.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to implement one or more techniques 198 for allocating uplink resources, such as PUCCH resources, for non-unicast AF of downlink non-unicast data (such as multicast data). These resource allocation techniques can be used by a UE to determine uplink resources for sending unicast AF with dedicated resources, multicast AF with dedicated resources, and unicast AF and multicast AF with shared resources.

uplink resource(s) allocation techniques, which are described in greater detail hereinafter, are provided to determine a PUCCH resource for transmitting multicast acknowledgement (ACK)/negative acknowledgement (NACK) feedback to a base station in response to the received multicast data associated with one or more multicast services. These techniques are especially important to support the acknowledgement of MBMS and eMBMS data transmissions in 5G networks. Although the following description may be focused on 5G NR, the techniques and concepts described herein may be applicable to other similar areas, such as LTE, LTE-A, and other wireless technologies, where a UE needs to allocate uplink resources in which to send AF for multicast data associated with one or more multicast services.

2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
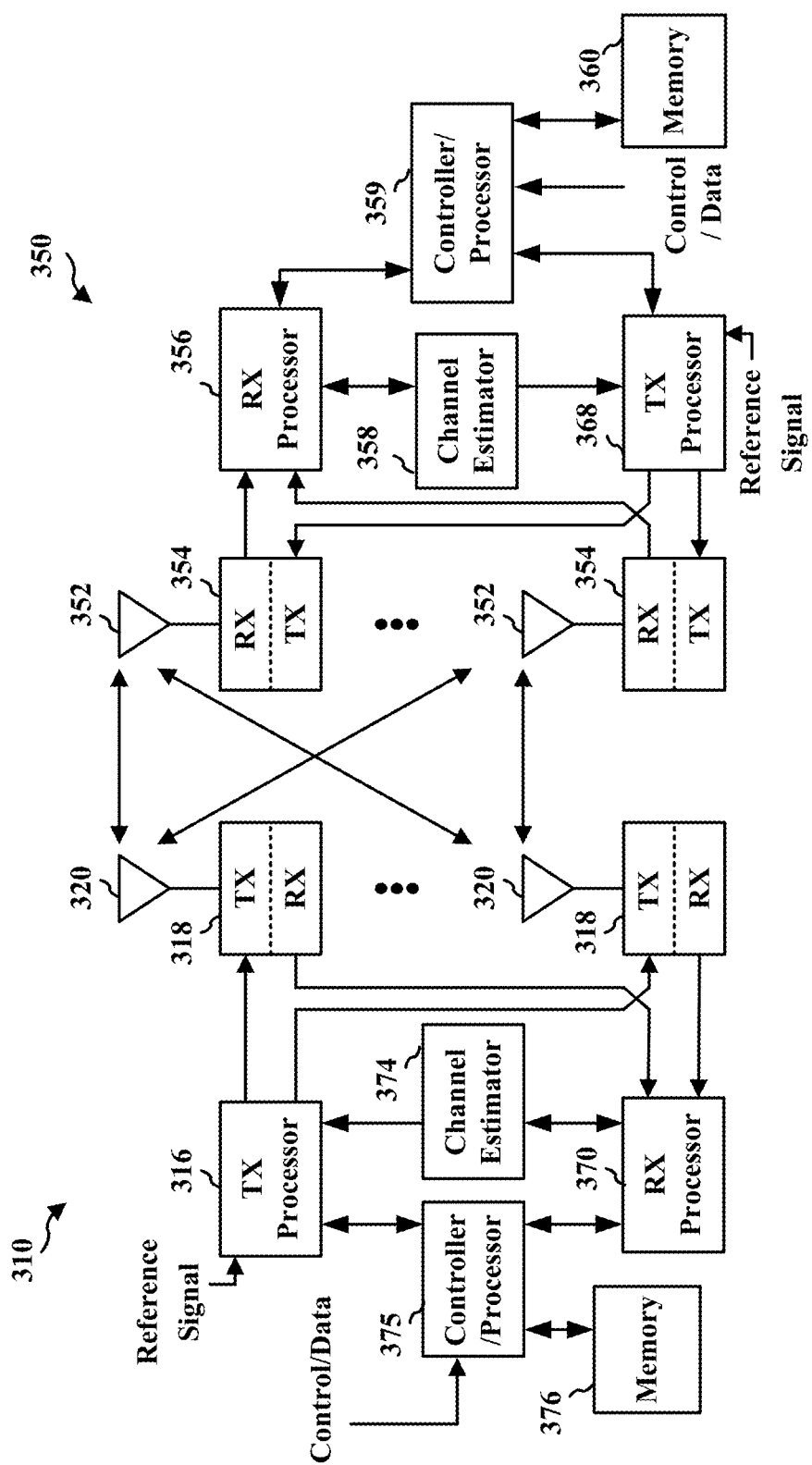
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with uplink control channel resource allocation techniques 198 for acknowledgement of downlink MC/BC data transmissions as described with reference to FIG. 1.

MBMS may support sending the same multimedia content to everyone (referred to herein as a broadcast (BC)) or sending the same multimedia content to a group of subscribers (referred to herein as multicast (MC)). Sending multimedia content to individual subscribers in a point-to-point fashion (referred to herein as unicast (UC)) is another way in which multimedia content is delivered (for example, music streaming applications associated with individual subscribers may consume music through UC). MBMS can support applications, such as TV programs, movies, sports events and music concerts. Also, as the Internet of Things (IoT) continues to proliferate, MC/BC may become more important as a useful tool to perform a software update on a program that may be executing on a number of similar machines.

In order to improve the reliability of MC/BC data transmissions, an error-control method for data transmission that uses acknowledgements can be utilized. For example, acknowledgements can be utilized to detect and to correct packet errors. There remains a need for techniques enabling a UE to determine uplink resources for sending acknowledgement feedback for received MC/BC data.

The techniques described below can be used by a UE to allocate uplink resources for sending AF for MC/BC data using a configuration of PUCCH resources that is independent from a configuration of PUCCH resources used for sending unicast AF. The described techniques also enable a UE to allocate uplink resources to send unicast data AF and MC/BC AF data in a concurrent fashion.

Independent PUCCH Resource Set(s) and PUCCH Resources for Unicast Acknowledgement and Multicast/Broadcast (MC/BC) Acknowledgement A first resource allocation technique provides independent PUCCH resource sets for use in acknowledging unicast data transmissions and independent PUCCH resource sets for use in acknowledging MC/BC data transmissions. Non-unicast data transmissions can include non-unicast multicast data transmissions, broadcast data transmissions, MBMS transmissions, eMBMS transmissions, and other transmissions that are point to multipoint.

FIG. 4 illustrates physical uplink control channel (PUCCH) resource configurations according to some implementations. For example, FIG. 4 illustrates a PUCCH resource configuration for unicast AF 404, a PUCCH resource configuration for MC/BC AF 440 and several PUCCH resource determination techniques that can be applied to the configurations to determine a PUCCH resource for use in sending MC/BC AF to a base station. The PUCCH resource configuration for unicast AF 404 and the PUCCH resource configuration for MC/BC AF 440 are for a first UE. Each UE may be separately configured with its own PUCCH resource configuration for MC/BC AF and PUCCH resource configuration for unicast AF 404. The uplink resource allocation techniques may include different PUCCH resource determination techniques, such as techniques 474, 478, 484, 488, 494, and 498 according to some implementations.

When implementing techniques 474, 478, 484, 488, the UE uses a PUCCH resource configuration for MC/BC AF. When implementing a first technique 474, the UE determines a PUCCH resource for MC/BC AF based on UCI and PRI. When implementing a second technique 478, the UE determines a PUCCH resource for MC/BC AF based on UCI and PRI and further on a CCE index. When implementing a third technique 484, the UE determines a PUCCH resource for MC/BC AF based on UCI, PRI and an offset value. When implementing a fourth technique 488, the UE determines a PUCCH resource for MC/BC AF based on UCI, PRI, a CCE index and an offset value. When implementing fifth and sixth techniques 494 and 498, the UE uses a PUCCH resource configuration for unicast AF. When implementing the fifth technique 494, the UE determines a PUCCH resource for MC/BC AF based on UCI, PRI and an offset value. When implementing a sixth technique 498, the UE determines a PUCCH resource for MC/BC AF based on UCI, PRI, a CCE index and an offset value.

In some implementations, a parameter used to configure a PUCCH resource for HARQ-ACK feedback for MC/BC data is different than a parameter used to configure a PUCCH resource for HARQ-ACK feedback for unicast data. For example, a configuration of the PUCCH resource(s) for transmitting MC/BC ACK/NACK feedback may be provided by a base station through a first set of RRC parameters, and a configuration of the PUCCH resource(s) for transmitting unicast ACK/NACK feedback may be provided by a second set of RRC parameters that may be different than the first set of RRC parameters. In some implementations, different parameters can be used to configure different UEs and different parameters can be used to configure the uplink resources (such as PUCCH resources) for unicast AF and MC/BC AF. The PUCCH resources may be different or may not be different across different UEs.

A UE configured to receive MC/BC data is also configured with a radio network temporary identifier (RNTI) for receiving the MC/BC data. The RNTI for receiving the MC/BC data is used for (1) scrambling cyclic redundancy check (CRC) of a DCI format scheduling MC/BC data, (2) scrambling CRC of MC/BC data, or both. If the CRC of the DCI format scheduling the MC/BC data is scrambled by the RNTI for receiving the MC/BC data, the UE can distinguish whether a detected DCI format schedules unicast data or MC/BC data based on a CRC check. For example, if the CRC of the MC/BC data is scrambled by the RNTI for receiving the MC/BC data, the UE may determine that the received data is MC/BC data.

Independent PUCCH Resource Set(s) and PUCCH Resources for Multiple Multicast Acknowledgement A second resource allocation technique provides independent PUCCH resource sets for use in acknowledging multicast data transmissions and independent PUCCH resource sets for use in acknowledging multicast data transmissions for different multicast services. A UE may be configured to receive group-common (GC) PDSCH that correspond to one or multiple multicast services (e.g., Multicast A, Multicast B, and so on) in a serving cell or in a cell-group or in a PUCCH-group. In some aspects, a cell group can refer to a group of cells that share the PUCCH cell (or PUCCH resource) for HARQ-ACK for dual connectivity (DC). In some aspects, a PUCCH-group can refer to a group of cells that share the PUCCH cell (or PUCCH resource) for HARQ-ACK for carrier aggregation (CA). For a GC PDSCH or for a GC PDCCH that schedules a GC PDSCH, which multicast service it belongs to can be identified by the UE based on a RRC configuration and/or physical layer indication.

In some aspects, a UE may be configured with multiple different group RNTIs (G-RNTIs) that are associated with different multicast services. In this regard, the UE may monitor for a GC PDCCH with CRC scrambled by the different G-RNTIs. Once the UE detects a GC PDCCH with a particular G-RNTI, the UE can acquire the PDSCH scheduled by the GC PDCCH associated with a corresponding multicast service.

In other aspects, the UE may be configured with multiple control resource sets (CORESETs) that are associated with different multicast services. In this regard, the UE may monitor for a GC PDCCH within a particular PDCCH CORESET. Once the UE detects a GC PDCCH transmitted within the particular CORESET, the UE can acquire the PDSCH scheduled by the GC PDCCH associated with a particular multicast service.

In still other aspects, the UE may be configured with multiple search space sets that are associated with different multicast services. In this regard, the UE may monitor for a GC PDCCH within a particular search space set. Once the UE detects a GC PDCCH transmitted within the particular search space set, the UE can acquire the PDSCH scheduled by the GC PDCCH associated with a particular multicast service.

In yet other aspects, the UE may be configured with multiple cells that are associated with different multicast services. In this regard, the UE may monitor for a GC PDCCH that is transmitted by a particular cell. Once the UE detects a GC PDCCH transmitted by the particular cell, the UE can acquire the PDSCH scheduled by the GC PDCCH associated with a particular multicast service.

Figure 5:
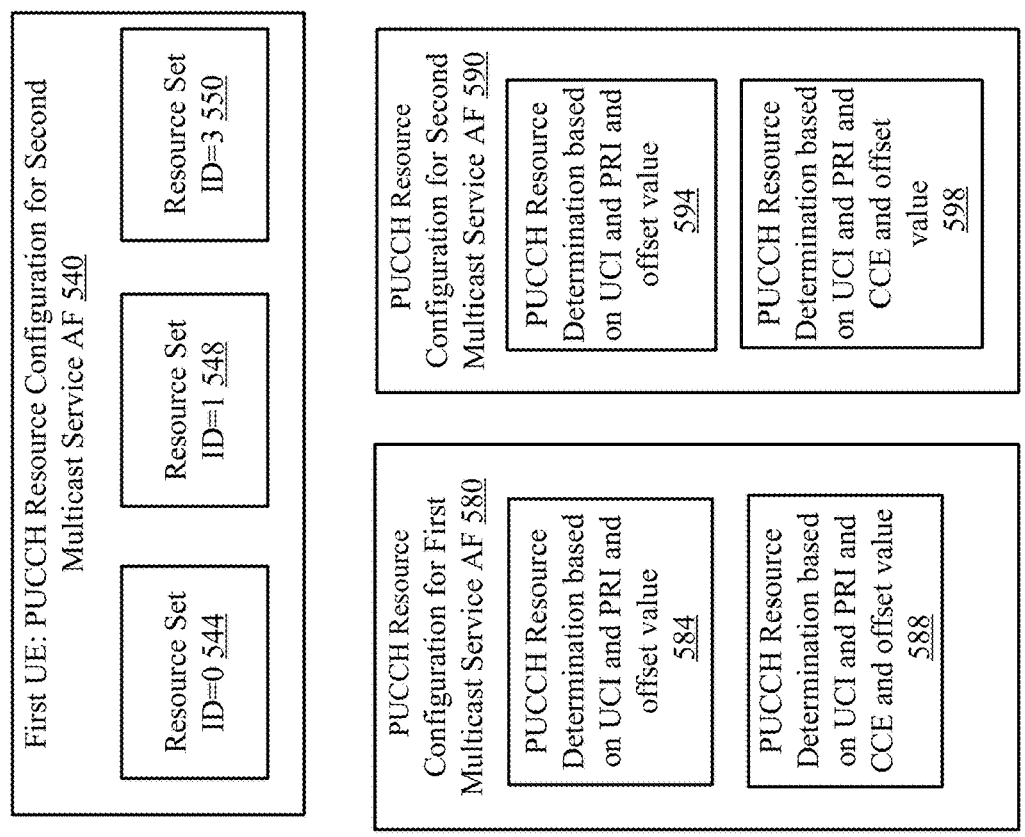
FIG. 5 illustrates physical uplink control channel (PUCCH) resource configurations for multiple multicast transmissions according to some implementations.

FIG. 5 illustrates physical uplink control channel (PUCCH) resource configurations for multiple multicast transmissions according to some implementations. For example, FIG. 5 illustrates a PUCCH resource configuration for a first multicast service 504, a PUCCH resource configuration for a second multicast service 540 and several PUCCH resource determination techniques that can be applied to the configurations to determine a PUCCH resource for use in sending multicast AF to a base station. The PUCCH resource configuration for the first multicast service 504 and the PUCCH resource configuration for the second multicast service 540 are for a first UE. Each UE may be separately configured with its own PUCCH resource configuration for a particular multicast service (e.g., a first multicast service, a second multicast service). The uplink resource allocation techniques may include different PUCCH resource determination techniques, such as techniques 564, 568, 574, 578, 584, 588, 594, and 598 according to some implementations.

When implementing techniques 564, 568, 584 and 588, the UE uses a PUCCH resource configuration for a first multicast service. When implementing a first technique 564, the UE determines a PUCCH resource for the first multicast service based on an amount of the UCI payload and PRI. When implementing a second technique 568, the UE determines a PUCCH resource for the first multicast service based on one or multiple of the amount of UCI payload, PRI, and one of a CCE index(es) where the scheduling DCI is transmitted. When implementing a third technique 584, the UE determines a PUCCH resource for the first multicast service based on UCI, PRI and an offset value. When implementing a fourth technique 588, the UE determines a PUCCH resource for the first multicast service based on the amount of UCI payload, PRI, one of CCE index(es) where the scheduling DCI is transmitted, and an offset value.

When implementing techniques 574, 578, 594 and 598, the UE uses a PUCCH resource configuration for a second multicast service. When implementing a fifth technique 574, the UE determines a PUCCH resource for the second multicast service based on UCI and PRI. When implementing a sixth technique 578, the UE determines a PUCCH resource for the second multicast service based on UCI and PRI and further on a CCE index. When implementing a seventh technique 594, the UE determines a PUCCH resource for the second multicast service based on UCI, PRI and an offset value. When implementing an eighth technique 598, the UE determines a PUCCH resource for the second multicast service based on UCI, PRI, a CCE index and an offset value.

In some implementations, a parameter used to configure a PUCCH resource for HARQ-ACK feedback for multicast data associated with a first multicast service may be different than a parameter used to configure a PUCCH resource for HARQ-ACK feedback for multicast data associated with a second multicast service. For example, a configuration of the PUCCH resource(s) for transmitting ACK/NACK feedback for a first multicast service (e.g., Multicast A) may be provided by a base station through a first set of RRC parameters, and a configuration of the PUCCH resource(s) for transmitting ACK/NACK feedback for a second multicast service (e.g., Multicast B) may be provided by a second set of RRC parameters that may be different than the first set of RRC parameters. In some implementations, different parameters can be used to configure different UEs and different parameters can be used to configure the uplink resources (such as PUCCH resources) for first multicast service AF and second multicast service AF. The PUCCH resources may be different or may not be different across different UEs.

A UE configured to receive multicast data associated with a particular multicast service is also configured with a G-RNTI for receiving the multicast data. The G-RNTI for receiving the multicast data is used for (1) scrambling CRC of a DCI format scheduling multicast data, (2) scrambling multicast data, or both. If the CRC of the DCI format scheduling the multicast data is scrambled by a particular G-RNTI for receiving the corresponding multicast data, the UE can distinguish whether a detected DCI format schedules multicast data associated with a first multicast service or multicast data associated with a second multicast service based on a CRC check. For example, if the CRC of the multicast data is scrambled by a particular G-RNTI for receiving multicast data of a particular multicast service, the UE may determine that the received data is multicast data of that particular multicast service.

In one or more implementations, the UE determines a PUCCH resource based on whether both unicast and multicast data are present or only multicast data is present. In some aspects, if unicast data and multicast data are both present, then the UE can determine the PUCCH resource based on a last unicast PRI. For example, if there are multiple multicast data corresponding to multiple multicast services, the UE can follow a particular multicast PRI to determine a PUCCH resource. In some aspects, the UE can follow the lowest multicast index or highest multicast index if the index is defined and is configured to each multicast service. For example, the multicast data having the highest index would precede the last multicast data amongst all of the multicast data. In some aspects, the UE can follow the multicast data that is lastly received at the UE amongst other multiple multicast data whose HARQ-ACK information bits are transmitted using the same PUCCH. In other aspects, if only multicast data is present, then the UE can determine the PUCCH resource based on a multicast PRI (if present), and if applicable, the UE can follow the first CCE index of the multicast PDCCH.

Figure 6:
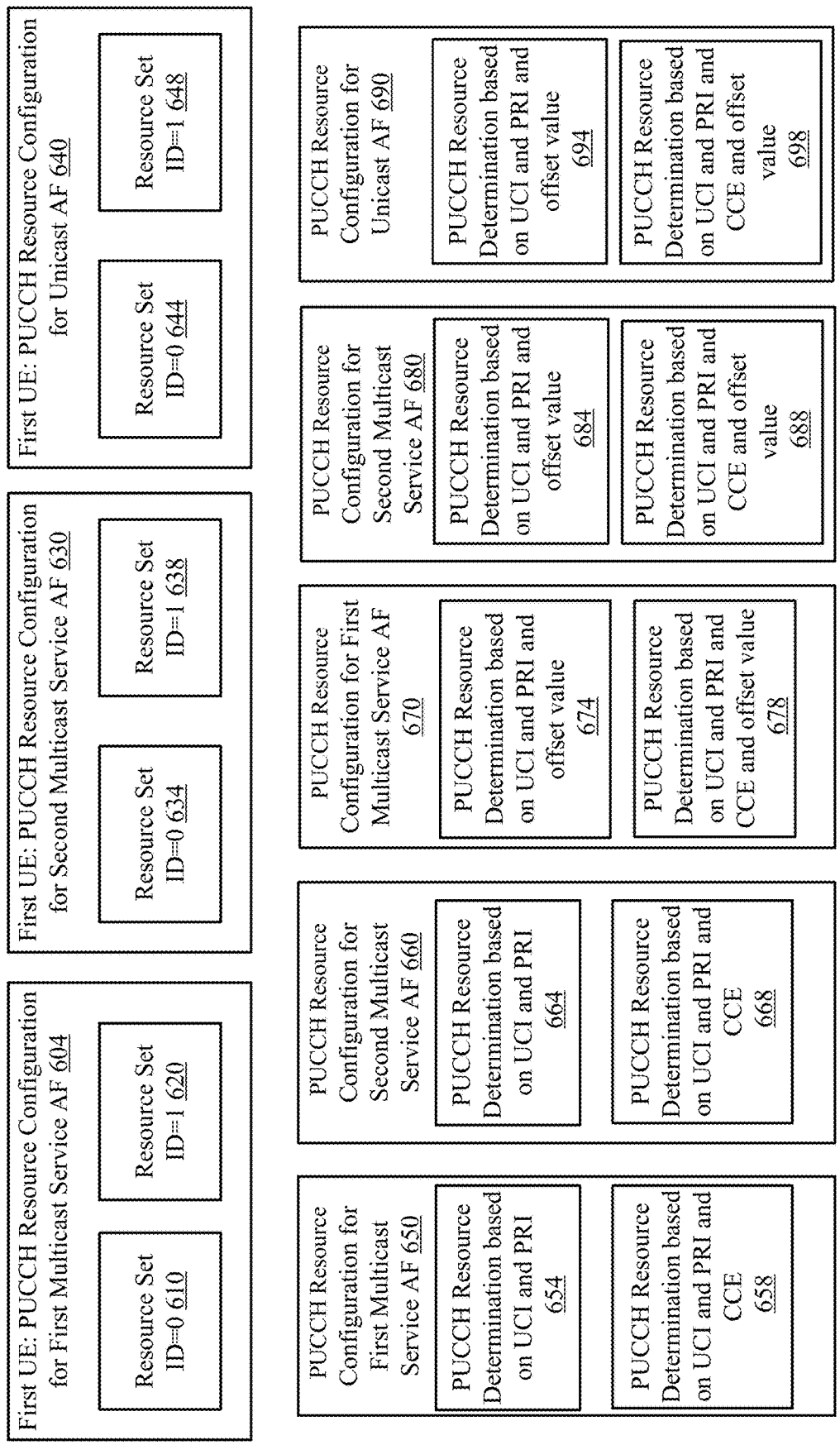
FIG. 6 illustrates physical uplink control channel (PUCCH) resource configurations for multiple multicast and unicast transmissions according to some implementations.

FIG. 6 illustrates physical uplink control channel (PUCCH) resource configurations for multiple multicast and unicast transmissions according to some implementations. A third resource allocation technique provides independent PUCCH resource sets for use in acknowledging unicast and multicast data transmissions and independent PUCCH resource sets for use in acknowledging unicast data transmissions and multicast data transmissions for different multicast services in a serving cell or in a cell-group or in a PUCCH-group. For example, FIG. 6 illustrates a PUCCH resource configuration for a first multicast service AF 604, a PUCCH resource configuration for a second multicast service AF 630, a PUCCH resource configuration for unicast AF 640 and several PUCCH resource determination techniques that can be applied to the configurations to determine a PUCCH resource for use in sending multicast AF to a base station. The PUCCH resource configuration for the first multicast service AF 604, the PUCCH resource configuration for the second multicast service AF 630 and the PUCCCH resource configuration for the unicast AF 640 are for a first UE. Each UE may be separately configured with its own PUCCH resource configuration for a particular multicast service AF (e.g., 604, 630) and PUCCH resource configuration for unicast AF 640. The uplink resource allocation techniques may include different PUCCH resource determination techniques, such as techniques 654, 658, 664, 668, 674, 678, 684, 688, 694, and 698 according to some implementations.

When implementing techniques 664, 658, 674 and 678, the UE uses a PUCCH resource configuration for a first multicast service. When implementing a first technique 654, the UE determines a PUCCH resource for the first multicast service based on UCI and PRI. When implementing a second technique 658, the UE determines a PUCCH resource for the first multicast service based on UCI and PRI and further on a CCE index. When implementing a third technique 674, the UE determines a PUCCH resource for the first multicast service based on UCI, PRI and an offset value. When implementing a fourth technique 678, the UE determines a PUCCH resource for the first multicast service based on UCI, PRI, a CCE index and an offset value.

When implementing techniques 664, 668, 684 and 688, the UE uses a PUCCH resource configuration for a second multicast service. When implementing a fifth technique 664, the UE determines a PUCCH resource for the second multicast service based on UCI and PRI. When implementing a sixth technique 668, the UE determines a PUCCH resource for the second multicast service based on UCI and PRI and further on a CCE index. When implementing a seventh technique 684, the UE determines a PUCCH resource for the second multicast service based on UCI, PRI and an offset value. When implementing an eighth technique 688, the UE determines a PUCCH resource for the second multicast service based on UCI, PRI, a CCE index and an offset value. When implementing a ninth technique 694, the UE determines a PUCCH resource for unicast AF based on UCI, PRI and an offset value. When implementing a tenth technique 698, the UE determines a PUCCH resource for the unicast AF based on UCI, PRI, a CCE index and an offset value.

Figure 7:
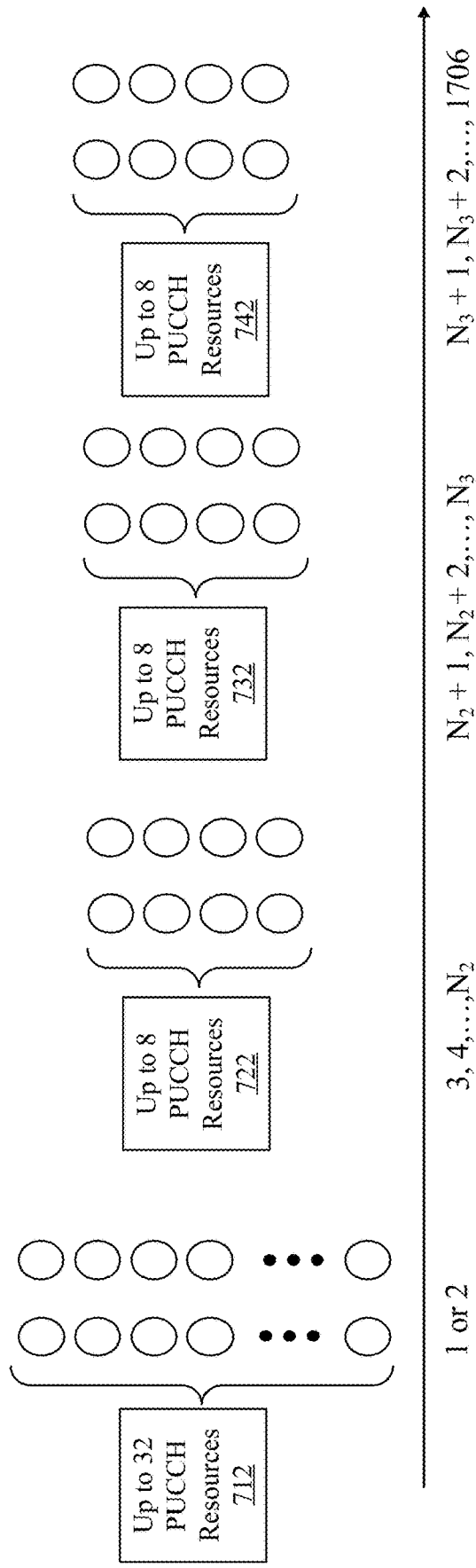
FIG. 7 is a diagram illustrating a number of resource sets that can be used for transmitting MC/BC AF according to some implementations.

FIG. 7 is a diagram illustrating a number of PUCCH resource sets 700 that can be used for transmitting MC/BC AF according to some implementations. Referring to FIG. 7, the PUCCH resource configuration for MC/BC AF includes one or more PUCCH resource sets, where each PUCCH resource set includes one or more PUCCH resources. According to some implementations, the MC/BC configurations includes four PUCCH resources sets that are identified with an identifier (ID) of 0, 1, 2, or 3. The first PUCCH resource set 710 (PUCCH resource set with ID equal to 0) may have up to 32 PUCCH resources 712. The second PUCCH resource set 720, third PUCCH resource set 730, and fourth PUCCH resource set 740 correspond to PUCCH resource set with ID equal to 1, PUCCH resource set with ID equal to 2, and PUCCH resource set with ID equal to 3, respectively. Each of these PUCCH resource sets 720, 730, 740 may have up to 8 PUCCH resources (such as PUCCH resources 722, 732, 742). Each of the PUCCH resource sets also correspond to a certain number of UCI bits 750. For example, the first resource set 710 may correspond to 1 or 2 UCI bits, the second resource set 720 may correspond to 3 to $N_2$ UCI bits, the third resource set 730 may correspond to $N_2+1$ to $N_3$ UCI bits, and the fourth resource set 740 may correspond to $N_3+1$ to 1706 UCI bits.

In some implementations, a PUCCH resource (such as resources 712, 722, 732, and 742) includes one or more of the following: a resource ID, a start resource block (start-RB), a second hop resource block (second-hop-RB), intra-slot frequency hopping (FH), format, format-specific parameters, or other parameters. When the UE receives MC/BC data from a base station, the UE may select a PUCCH resource set from the MC/BC PUCCH resource configuration and then may further select one or more specific PUCCH resources from that PUCCH resource set to send MC/BC AF to the base station. When a UE transmits HARQ-ACK feedback for MC/BC downlink data, the UE determines a PUCCH resource for HARQ-ACK for MC/BC according to the PUCCH resource(s) selected for the MC/BC.

The MC/BC AF may be included in the UCI payload as a sequence of UCI bits. In some implementations, one or multiple bits in the UCI payload in the PUCCH may indicate an ACK/NACK for MC/BC data. The UE determines based on one or more bits in the UCI payload the PUCCH resource set from which to select one or more PUCCH resources that are utilized by the UE to send the MC/BC AF.

In an implementation, a PUCCH resource can be represented by an index. For AF, the resource index to use may be given as a function of the first CCE index in the PDCCH used to schedule the downlink data transmission. In this manner, there is no need to explicitly include information about PUCCH resources in the downlink scheduling assignment. In addition to dynamic scheduling using PDCCH, the base station may semi-persistently schedule a UE according to a specific pattern. In this case, configuration of the semi-persistent scheduling pattern includes information on the PUCCH index to use for AF.

For example, the UE may select one of the PUCCH resources sets according to the UCI payload. The UE may select the one PUCCH resource in the PUCCH resource set further based on a PUCCH resource indicator (PRI) value. For example, when the number of UCI bits is 1 or 2, and the first PUCCH resource set 710 is selected, the UE uses the PRI value and the first CCE index where the PDCCH is detected to identify one or more PUCCH resources for transmitting MC/BC AF.

The UE may detect DCI scheduling and determine that there is unicast data transmission, MC/BC data transmission, or both on the downlink. The UE can identify data transmissions directed to it by using RNTI. For a PUCCH transmission for unicast AF (such as HARQ-ACK feedback) for unicast data, the UE may determine PUCCH resource(s) for the unicast AF according to the PRI in the DL DCI scheduling the unicast data. In some implementations, when the UCI payload is 1 or 2 bits, and the number of PUCCH resources in the PUCCH resource set with ID equal to 0 is more than eight, the UE also uses the first CCE index to determine the PUCCH resource to use for unicast AF.

For a PUCCH transmission for MC/BC AF for MC/BC data, the UE also may determine one or more PUCCH resources according to the PRI in the DL DCI scheduling the MC/BC data. In some implementations, when the UCI payload is 1 or 2 bits, and the number of PUCCH resources in the PUCCH resource set with ID equal to 0 is more than eight, the UE also uses the first CCE index to determine the PUCCH resource to use for MC/BC AF.

In some aspects, the UE may detect DCI scheduling and determine that there is a multicast data transmission for a particular multicast service on the downlink. The UE can identify data transmissions directed to it by using G-RNTI. For a PUCCH transmission for HARQ-ACK feedback for multicast data of a first multicast service (e.g., "Multicast A"), the UE also may determine one or more PUCCH resources according to the PRI in the DL DCI scheduling the Multicast A data. In some implementations, when the UCI payload is 1 or 2 bits, and the number of PUCCH resources in the PUCCH resource set with ID equal to 0 is more than eight, the UE also uses the first CCE index to determine the PUCCH resource to use for the first multicast service AF.

For a PUCCH transmission for HARQ-ACK feedback for multicast data of a second multicast service (e.g., "Multicast B"), the UE also may determine one or more PUCCH resources according to the PRI in the DL DCI scheduling the Multicast B data. In some implementations, when the UCI payload is 1 or 2 bits, and the number of PUCCH resources in the PUCCH resource set with ID equal to 0 is more than eight, the UE also uses the first CCE index to determine the PUCCH resource to use for the second multicast service AF.

Offset Values

A UE can be configured to apply offset values to the ID(s) of the PUCCH resource(s) in each PUCCH resource set(s) for MC/BC AF. For example, when a UE transmits HARQ-ACK feedback for a MC/BC DL data, the UE may determine a PUCCH resource for HARQ-ACK for MC/BC AF according to an offset value applied to the ID of the PUCCH resource in the PUCCH resource set for the MC/BC AF.

In some implementations, the UE may select one of the PUCCH resource sets according to the UCI payload (such as the number of UCI information bits) in the PUCCH. One of the PUCCH resources in the PUCCH resource set may be further selected by the UE according to a PRI value. When the PUCCH resource set has an ID equal to 0, the UE may determine PUCCH resources based on both a PRI value and the first CCE index, where the PDCCH is detected. In some implementations, the UE may add an offset value to the ID of the PUCCH resource in the PUCCH resource set to determine a final PUCCH resource. For each value of PRI, a different offset value may be configured. For example, a first offset value is configured for PRI equal to 0, and a second offset value is configured for PRI equal to 1, and so on.

Uplink Resource Allocation Process Flow

Figure 8:
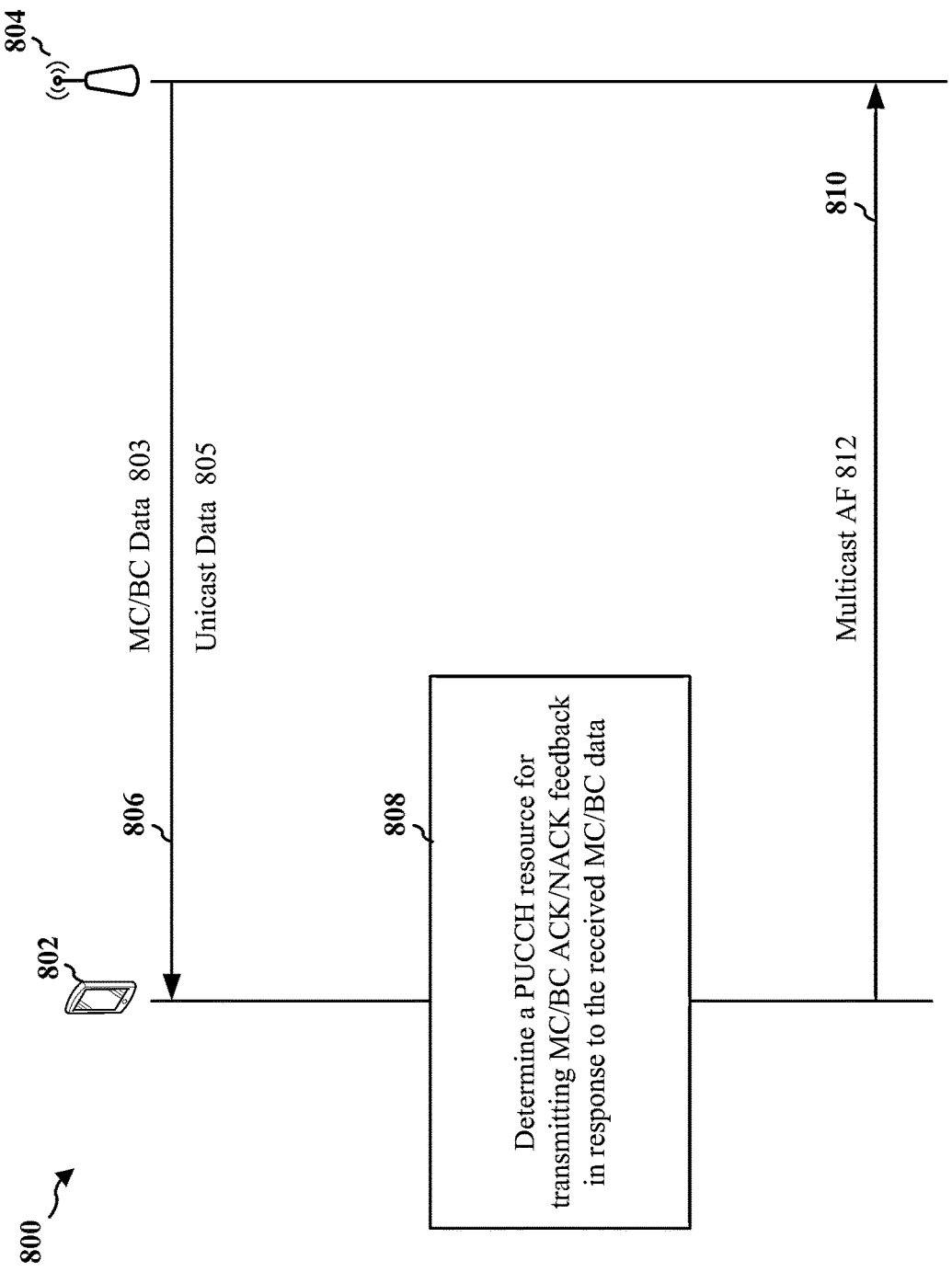
FIG. 8 illustrates a process flow for allocating PUCCH resources for transmitting MC/BC AF according to some implementations.

FIG. 8 illustrates a process flow 800 for allocating PUCCH resource(s) for transmitting MC/BC acknowledgement feedback (AF) according to some implementations. At 806, the UE 802 receives MC/BC data 803 from a base station 804. In some examples, the UE 802 also receives unicast data 805 from the base station 804 at 806.

In block 808, the UE 802 determines one or more PUCCH resources for transmitting MC/BC ACK/NACK feedback in response to the received MC/BC data 803. In some examples, in block 808, the UE 802 also determines PUCCH resources for transmitting unicast ACK/NACK feedback in response to the received unicast data 805 when unicast data 805 is received in block 806.

At 810, the UE 802 sends the MC/BC AF feedback 812 to the base station 804 in the determined PUCCH resource. In some examples, the UE 802 also sends unicast AF to the base station 804 at 810. In some implementations, at 810, the UE 802 sends the unicast AF on resources dedicated for unicast AF and sends MC/BC AF 812 on other resources dedicated for MC/BC AF. In some other implementations, the UE 802 may send unicast AF and MC/BC AF 812 on shared resources.

A UE may not expect to transmit more than one PUCCH with HARQ-ACK information in a slot. In this case, the first resource allocation technique described above operates as follows. In one slot, a HARQ-ACK for unicast is sent. In another slot, a HARQ-ACK for MC/BC is sent. One shortcoming of this approach is that two slots are necessary for sending HARQ-ACK feedback for MC/BC data and HARQ-ACK feedback for unicast data.

For a slot having a PUCCH for HARQ-ACK for MC/BC, HARQ-ACK for unicast may not be mapped to that slot. Similarly, for a slot having a PUCCH for HARQ-ACK for unicast, a HARQ-ACK for MC/BC may not be mapped to that slot. The second resource allocation technique, which is described below, may use shared resources to send unicast AF and MC/BC AF in a concurrent fashion. In some implementations, the UE may send the unicast AF and MC/BC AF in the same slot overcoming the shortcoming of the first technique. For example, the UE may utilize time division multiplexing (TDM), frequency division multiplexing (FDM), or codebook multiplexing (CM) to concurrently send the unicast AF and MC/BC AF.

Figure 9:
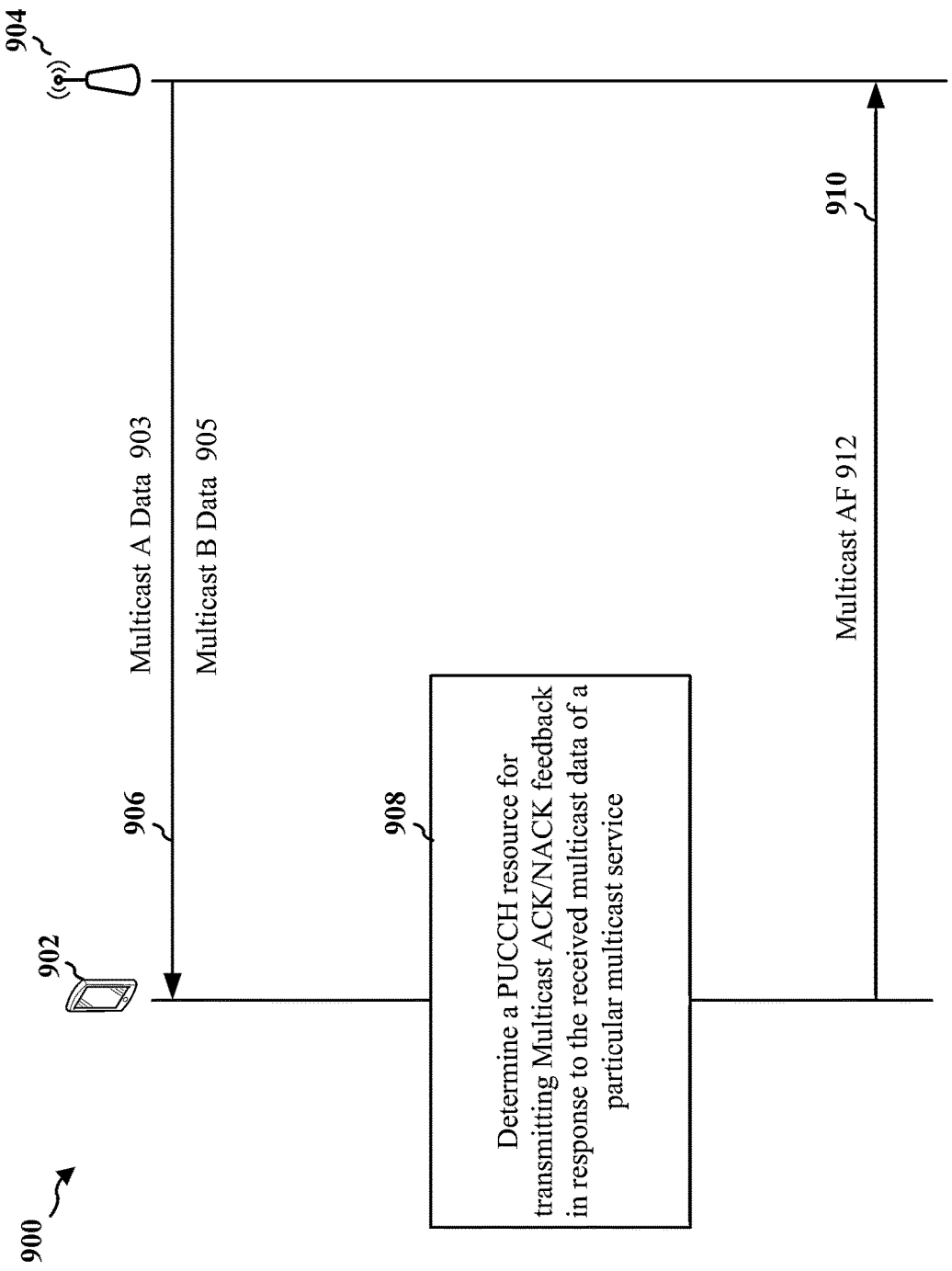
FIG. 9 illustrates a process flow for allocating PUCCH resource(s) for transmitting multicast AF for different multiple multicast services according to some implementations.

FIG. 9 illustrates a process flow 900 for allocating PUCCH resource(s) for transmitting multicast AF for different multicast services according to some implementations. At 906, the UE 902 receives multicast data 903 associated with a first multicast service (e.g., Multicast A data) from a base station 904. In some examples, the UE 902 also receives multicast data 905 associated with a second multicast service (e.g., Multicast B data) from the base station 904 at 906.

In block 908, the UE 902 determines one or more PUCCH resources for transmitting multicast ACK/NACK feedback in response to the received multicast A data 903. In some examples, in block 908, the UE 902 also determines PUCCH resources for transmitting multicast ACK/NACK feedback in response to the received multicast B data 905 when the multicast B data 905 is received in block 906.

At 910, the UE 902 sends the multicast A AF 912 to the base station 904 in the determined PUCCH resource. In some examples, the UE 902 also sends multicast B AF to the base station 904 at 910. In some implementations, at 910, the UE 902 sends the multicast A AF 912 on resources dedicated for multicast A and sends multicast B AF on other resources dedicated for multicast B. In some other implementations, the UE 902 may send multicast A AF 912 and multicast B AF on shared resources.

A UE may not expect to transmit more than one PUCCH with HARQ-ACK information in a slot. In this case, the first resource allocation technique described above operates as follows. In one slot, a HARQ-ACK for unicast is sent. In another slot, a HARQ-ACK for MC/BC is sent. One shortcoming of this approach is that two slots are necessary for sending HARQ-ACK feedback for MC/BC data and HARQ-ACK feedback for unicast data.

For a slot having a PUCCH for HARQ-ACK for MC/BC, HARQ-ACK for unicast may not be mapped to that slot. Similarly, for a slot having a PUCCH for HARQ-ACK for unicast, a HARQ-ACK for MC/BC may not be mapped to that slot. A fourth resource allocation technique, which is described below, may use shared resources to send unicast AF and MC/BC AF in a concurrent fashion. In some implementations, the UE may send the unicast AF and MC/BC AF in the same slot overcoming the shortcoming of the first technique. For example, the UE may utilize time division multiplexing (TDM), frequency division multiplexing (FDM), or codebook multiplexing (CM) to concurrently send the unicast AF and MC/BC AF.

Time Division Multiplexed (TDM) MC/BC AF and Unicast AF

FIG. 10A is a diagram 1001 illustrating a TDM unicast AF 1008 and MC/BC AF 1010 according to some implementations. On the downlink, a first unicast data transmission 1002 is followed by a second unicast data transmission 1004, which in turn is followed by a MC/BC data transmission 1006. On the uplink, PUCCH for unicast AF 1008 (such as HARQ-ACK for unicast data 1002, 1004) and PUCCH for MC/BC AF 1010 (such as HARQ-ACK for MC/BC data 1006) may be time-division-multiplexed within the same slot or across slots.

In some implementations, for a given cell group or for a given PUCCH group, a PUCCH for HARQ-ACK for unicast data and a PUCCH for HARQ-ACK for MC/BC data may not overlap in time. In some other implementations, if a PUCCH for HARQ-ACK for unicast data and a PUCCH for HARQ-ACK for MC/BC data overlap in time, the UE may transmit only one of the MC/BC AF or the unicast AF, and drop the other AF. For example, the UE may select to transmit the unicast AF and drop the MC/BC AF. Alternatively, the UE may select to transmit the MC/BC AF and drop the unicast AF.

Frequency Division Multiplexed MC/BC AF and Unicast AF

FIG. 10B is a diagram 1011 illustrating a frequency division multiplexed (FDM) unicast AF and MC/BC AF according to some implementations. On the downlink, a first unicast data transmission 1012 is followed by a second unicast data transmission 1014, which in turn is followed by a MC/BC data transmission 1016. On the uplink, PUCCH for unicast AF 1018 (such as HARQ-ACK for unicast data 1012, 1014) and PUCCH for MC/BC AF 1020 (such as HARQ-ACK for MC/BC data 1016) may be frequency division multiplexed within the same set of consecutive symbols as shown.

In some implementations, for a given cell group or for a given PUCCH group, a PUCCH for HARQ-ACK for unicast data and a PUCCH for HARQ-ACK for MC/BC data may not overlap in frequency. In some other implementations, if a PUCCH for HARQ-ACK for unicast data and a PUCCH for HARQ-ACK for MC/BC data overlap in frequency, the UE may transmit only one of the MC/BC AF or the unicast AF, and drop the other AF. For example, the UE may choose to transmit the unicast AF and drop the MC/BC AF. Alternatively, the UE may choose to transmit the MC/BC AF and drop the unicast AF.

In some implementations, the PUCCH resources are restricted to consecutive (or almost consecutive) physical resource blocks (PRBs) so that intermodulation distortion (IMD) can be reduced. Also, in some implementations, the FDM may be limited to particular PUCCH format(s), such as PUCCH format 2. PUCCH format 2 is already a CP-OFDM waveform which is non-transform-precoding, and therefore as long as the PRBs are consecutive, FDM does not negatively impact PUCCH format 2 performance.

For the frequency-multiplexed PUCCHs, the UE may further control the transmission power. In some implementations, the UE may control the transmission power according to the following expression:

$$P = \min\{P_{cmax,c}, P_{0\_PUCCH} + 10 \log_{10}(M_{RB}^{PCCH1} + M_{RB}^{PUCCH2}) + PL_C + \Delta + g_c\},$$

where $P_{(cmax,c)}$ is the maximum available transmit power, where $P_{(0\_PUCCH)}$ is the target received power, where $M_{RB}^{PUCCH1} + M_{RB}^{PUCCH2}$ is the sum of the number of resource blocks (RBs) of the frequency multiplexed PUCCHs, where $PL_c$ is the path loss (PL) measured by a reference signal (RS), where $\Delta$ are other parameter(s)/factor(s), and where $g_c$ is a transmit power control (TPC) command (such as an accumulation TPC command or absolute TPC command).

Codebook Multiplexed MC/BC AF and Unicast AF

FIG. 10C is a diagram 1021 illustrating a codebook multiplexed (CM) unicast AF and MC/BC AF 1028 according to some implementations. On the downlink, a first unicast data transmission 1022 is followed by a second unicast data transmission 1024, which in turn is followed by a MC/BC data transmission 1026. On the uplink, PUCCH for unicast AF (such as HARQ-ACK for unicast data 1022, 1024) and PUCCH for MC/BC AF (such as HARQ-ACK for MC/BC data 1026) can be codebook multiplexed within the same slot as shown.

In some implementations, the UE multiplexes MC/BC AF and Unicast AF in one AF codebook of a PUCCH within a slot. For example, the AF codebook can include both HARQ-ACK for unicast data and HARQ-ACK for MC/BC data. In another implementation, the UE generates the bits of the unicast AF by following CBG-based HARQ-ACK codebook determination and Type for HARQ-ACK codebook (either Type1 or Type2). The UE may generate the bit(s) of the MC/BC AF according to the techniques described below for the case where there is a single bit in the MC/BC AF and for the case where there is more than one bit in the MC/BC AF.

TDM Multicast AF for Different Multiple Multicast

Figures 11A, 11B, 11C:
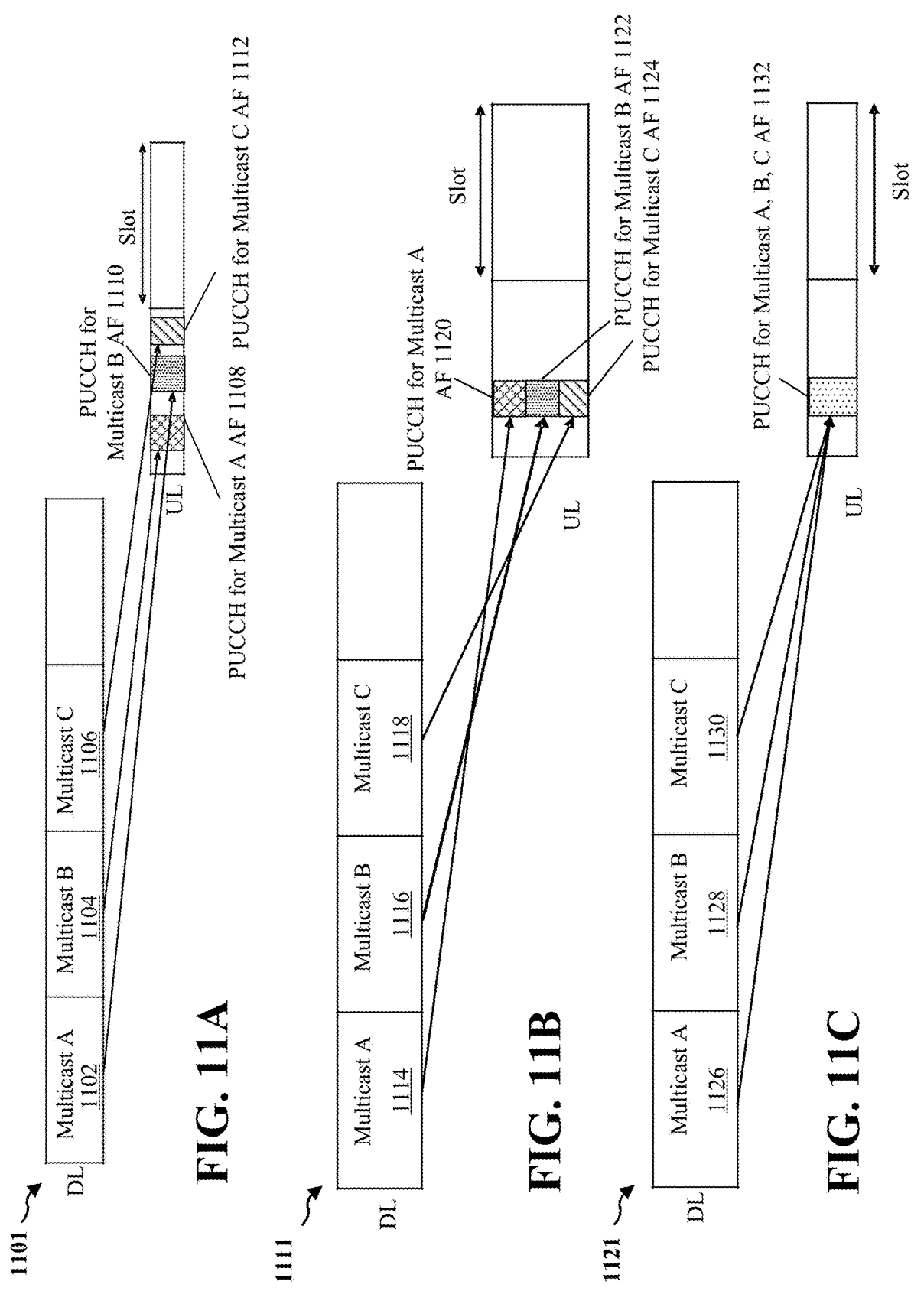

FIG. 11A is a diagram 1101 illustrating a TDM multicast AF for different multiple multicast services according to some implementations. On the downlink, a first multicast data transmission 1102 associated with a first multicast service ("Multicast A") is followed by a second multicast data transmission 1104 associated with a second multicast service ("Multicast B"), which in turn is followed by a third multicast data transmission 1106 associated with a third multicast service ("Multicast C"). On the uplink, PUCCH for Multicast A AF 1108 (such as HARQ-ACK for multicast data 1102), PUCCH for Multicast B AF 1110 (such as HARQ-ACK for multicast data 1104) and PUCCH for Multicast C AF 1112 (such as HARQ-ACK for multicast data 1106) may be time-division-multiplexed within the same slot or across different slots.

In some implementations, for a given serving cell or for a given cell group or for a given PUCCH group, a PUCCH for HARQ-ACK for multicast data for different multiple multicast services may not overlap in time. In some other implementations, if a PUCCH for HARQ-ACK for multicast data of a first multicast service and a PUCCH for HARQ-ACK for multicast data of a second multicast service overlap in time, the UE may transmit only one of the first multicast AF or the second multicast AF, and drop the other AF. For example, the UE may select to transmit the multicast B AF and drop the multicast A AF. Alternatively, the UE may select to transmit the multicast A AF and drop the multicast B AF.

FDM Multicast AF for Different Multiple Multicast

FIG. 11B is a diagram 1111 illustrating a FDM multicast AF for different multiple multicast services according to some implementations. On the downlink, a first multicast data transmission 1114 associated with a first multicast service ("Multicast A") is followed by a second multicast data transmission 1116 associated with a second multicast service ("Multicast B"), which in turn is followed by a third multicast data transmission 1118 associated with a third multicast service ("Multicast C"). On the uplink, PUCCH for Multicast A AF 1120 (such as HARQ-ACK for multicast data 1114), PUCCH for Multicast B AF 1122 (such as HARQ-ACK for multicast data 1116) and PUCCH for Multicast C AF 1124 (such as HARQ-ACK for multicast data 1118) may be frequency division multiplexed within the same set of consecutive symbols as shown.

In some implementations, for a given serving cell or for a given cell group or for a given PUCCH group, a PUCCH for HARQ-ACK for multicast data for different multiple multicast services may not overlap in frequency. In some other implementations, if a PUCCH for HARQ-ACK for multicast data of a first multicast service and a PUCCH for HARQ-ACK for multicast data of a second multicast service overlap in frequency, the UE may transmit only one of the first multicast AF or the second multicast AF, and drop the other AF. For example, the UE may select to transmit the multicast B AF and drop the multicast A AF. Alternatively, the UE may select to transmit the multicast A AF and drop the multicast B AF.

Codebook Multiplexed Multicast AF for Different Multiple Multicast

FIG. 11C is a diagram 1121 illustrating a codebook multiplexed (CDM) multicast AF 1132 for different multiple multicast services according to some implementations. On the downlink, a first multicast data transmission 1126 associated with a first multicast service ("Multicast A") is followed by a second multicast data transmission 1128 associated with a second multicast service ("Multicast B"), which in turn is followed by a third multicast data transmission 1130 associated with a third multicast service ("Multicast C"). On the uplink, PUCCH for Multicast AF (such as HARQ-ACK for multicast data 1126, 1128 and 1130) can be codebook multiplexed within the same slot as shown.

TDM Unicast AF and Multicast AF for Different Multiple Multicast

FIG. 12A is a diagram illustrating a time division multiplexed (TDM) unicast AF and MC/BC AF for different multiple multicast services according to some implementations. On the downlink, a unicast data transmission 1202 is followed by a first multicast data transmission 1204 associated with a first multicast service ("Multicast A"), which in turn is followed by a second multicast data transmission 1206 associated with a second multicast service ("Multicast B"). On the uplink, PUCCH for unicast AF 1208 (such as HARQ-ACK for unicast data 1202), PUCCH for Multicast A AF 1210 (such as HARQ-ACK for multicast A data 1204) and PUCCH for Multicast B AF 1212 (such as HARQ-ACK for multicast B data 1206) may be time-division-multiplexed within the same slot or across different slots.

In some implementations, for a given serving cell or for a given cell group or for a given PUCCH group, a PUCCH for HARQ-ACK for unicast data and a PUCCH for HARQ-ACK for multicast data for different multiple multicast services may not overlap in time. In some other implementations, if a PUCCH for HARQ-ACK for unicast data and a PUCCH for HARQ-ACK for multicast data of a particular multicast service overlap in time, the UE may transmit only one of the unicast AF or the multicast AF, and drop the other AF. For example, the UE may select to transmit the multicast AF and drop the unicast AF. Alternatively, the UE may select to transmit the unicast AF and drop the multicast AF.

FDM Unicast AF and Multicast AF for Different Multiple Multicast

FIG. 12B is a diagram illustrating a frequency division multiplexed (FDM) unicast AF and MC/BC AF for different multiple multicast services according to some implementations. On the downlink, a unicast data transmission 1214 is followed by a first multicast data transmission 1216 associated with a first multicast service ("Multicast A"), which in turn is followed by a second multicast data transmission 1218 associated with a second multicast service ("Multicast B"). On the uplink, PUCCH for unicast AF 1220 (such as HARQ-ACK for unicast data 1214), PUCCH for Multicast A AF 1222 (such as HARQ-ACK for multicast A data 1216) and PUCCH for Multicast B AF 1224 (such as HARQ-ACK for multicast B data 1218) may be frequency division multiplexed within the same set of consecutive symbols as shown.

In some implementations, for a given serving cell or for a given cell group or for a given PUCCH group, a PUCCH for HARQ-ACK for multicast data for different multiple multicast services may not overlap in frequency. In some other implementations, if a PUCCH for HARQ-ACK for unicast data and a PUCCH for HARQ-ACK for multicast data of a particular multicast service overlap in frequency, the UE may transmit only one of the unicast AF or the multicast AF, and drop the other AF. For example, the UE may select to transmit the multicast AF and drop the unicast AF. Alternatively, the UE may select to transmit the unicast AF and drop the multicast AF.

Codebook Multiplexed Unicast AF and Multicast AF for Different Multiple Multicast FIG. 12C is a diagram illustrating a codebook multiplexed (CDM) unicast AF and MC/BC AF 1232 for different multiple multicast services according to some implementations. On the downlink, a unicast data transmission 1226 is followed by a first multicast data transmission 1228 associated with a first multicast service ("Multicast A"), which in turn is followed by a second multicast data transmission 1230 associated with a second multicast service ("Multicast B"). On the uplink, PUCCH for unicast AF (such as HARQ-ACK for unicast data 1226) and PUCCH for Multicast AF (such as HARQ-ACK for multicast data 1228 and 1230) can be codebook multiplexed within the same slot as shown.

Single Bit in MC/BC AF

Figure 13A:
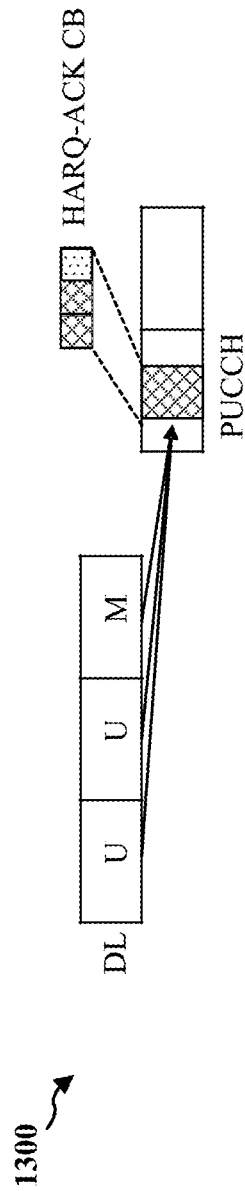
FIG. 13A is a diagram illustrating a codebook AF that includes unicast AF and MC/BC AF using a single bit for a first combination of data transmissions on the downlink.

FIG. 13A is a diagram 1300 illustrating a codebook AF that includes unicast AF and MC/BC AF using a single bit for a first combination of data transmissions on the downlink. In some aspects, HARQ-ACK feedback for unicast and HARQ-ACK feedback for multicast can be multiplexed in one HARQ-ACK codebook of a PUCCH within a slot. The HARQ-ACK bit generation for unicast data may follow the code block group (CBG)-based HARQ-ACK codebook determination and the type for HARQ-ACK codebook (e.g., either type 1 or type 2) in accordance with the standards specification TS 38.213 Section 9.1. As illustrated in FIG. 13A, the first combination of data transmissions on the downlink may include two unicast data transmissions followed by a MC/BC data transmission. In this situation, the UE may append the MC/BC AF bit to the end of the AF codebook after the bits used for unicast AF.

Figure 13B:
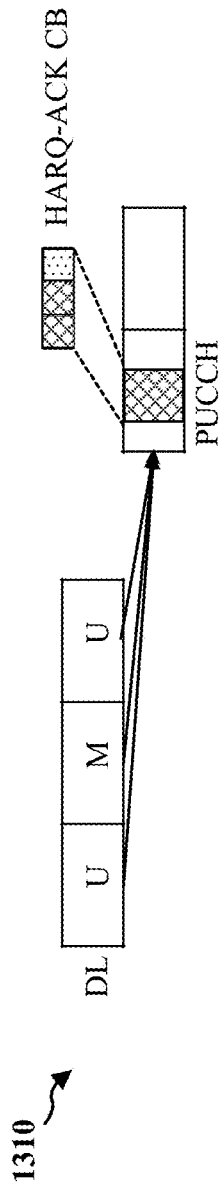
FIG. 13B is a diagram illustrating a codebook AF that includes unicast AF and MC/BC AF using a single bit for a second combination of data transmissions on the downlink.

FIG. 13B is a diagram 1310 illustrating a codebook AF that includes unicast AF and MC/BC AF with a single bit for a second combination of data transmissions on the downlink. The second combination of data transmissions on the downlink may include one unicast data transmission followed by a MC/BC data transmission, which in turn is followed by another unicast data transmission. In some implementations, although the MC/BC data is transmitted between two unicast data transmissions, the MC/BC AF may be appended to the end of the AF codebook after the bits used for unicast AF.

For a given PUCCH transmission, when the number of bits in the AF for MC/BC data is one, the UE may append the MC/BC AF to the HARQ-ACK codebook for unicast as long as there is an AF for unicast transmission. For example, the HARQ-ACK bit for MC/BC data may be appended to the end of the HARQ-ACK codebook for unicast. The UE may determine whether to append the MC/BC AF bit (such as HARQ-ACK bit for MC/BC) to the unicast HARQ-ACK codebook according to whether there is a possible PDSCH occasion for MC/BC in an AF window.

In some implementations, the UE may determine a PUCCH resource(s) based on the PRI in the latest scheduling DCI amongst the DCIs scheduling unicast data and MC/BC data whose ACK/NACK bits are multiplexed on the PUCCH. When the latest scheduled DCI corresponds to unicast data, the UE may determine a PUCCH resource(s) based on the PRI of the latest unicast data and the configurations of PUCCH resources/PUCCH resource sets configured for unicast AF. When the latest scheduled DCI corresponds to MC/BC data, the UE determines a PUCCH resource(s) based on the PRI of the latest MC/BC data and the configurations of PUCCH resources/PUCCH resource sets configured for MC/BC AF. When there is no AF for unicast in the PUCCH, the UE may determine a PUCCH resource by using the PRI in the scheduling DCI for MC/BC data and the configurations of PUCCH resources/PUCCH resource sets configured for MC/BC AF. The UE may transmit the MC/BC AF by using either a PUCCH format 0 or PUCCH format 1.

Alternatively, in other implementations, when there is a unicast data transmission followed by an MC/BC data transmission, the UE may use the PRI of the last unicast data transmission and the configurations of PUCCH resources/PUCCH resource sets configured for unicast AF to determine the PUCCH resource(s). When there is only a non-unicast data transmission (such as a MC/BC transmission), the UE may use the PRI of the MC/BC transmission and the configurations of PUCCH resources/PUCCH resource sets configured for MC/BC AF to determine a PUCCH resource(s). The UE may also use a first CCE index of the MC/BC PDCCH, in addition to the PRI of the MC/BC transmission, to select a PUCCH resource when the PUCCH resource set has an ID equal to 0.

In some implementations, the UE may append a single MC/BC ACK/NACK bit after the unicast HARQ-ACK codebook even if the UE does not receive MC/BC data. In this manner, the base station and UE have a common understanding of the MC/BC ACK/NACK bit generation. For example, a single bit ACK/NACK feedback for MC/BC may be appended regardless of whether the DCI scheduling MC/BC data is indeed detected in a monitoring occasion. As long as MC/BC data is potentially scheduled, or it is possible for DCI to be sent, this one bit may be present based on the semi-static configuration of MC/BC data reception and PDCCH monitoring for MC/BC data reception. A missed detection of PDCCH that schedules MC/BC data does not impact whether MC/BC ACK/NACK bit is appended. In this case, the UE does not need to use a downlink assignment index (DAI) since the MC/BC ACK/NACK bit is semi-statically added.

Multiple Bits in MC/BC AF

Figure 13C:
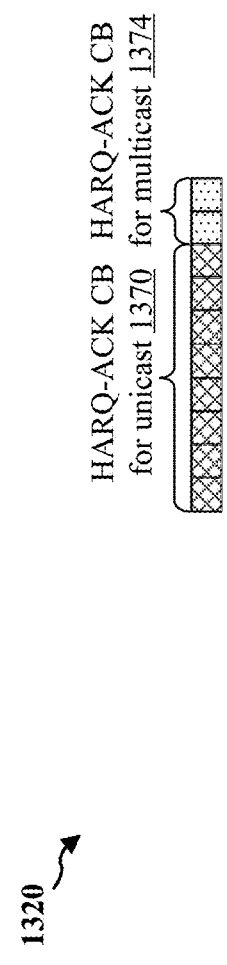
FIG. 13C is a diagram illustrating a codebook AF that includes unicast AF and MC/BC AF using more than one bit according to some implementations.

FIG. 13C is a diagram 1320 illustrating a codebook AF that includes unicast AF 1370 (such as a HARQ ACK codebook for unicast) and MC/BC AF 1374 with more than one bit (such as a HARQ ACK codebook for MC/BC) according to some implementations. The UE determines the number of bits in the MC/BC AF (such as the number of bits in MB/BC HARQ-ACK) and the bit order according to the DAI(s) of DL DCI(s) for MB/BC data. The UE determines the number of bits in the unicast AF (such as the number of bits in unicast HARQ-ACK) and the bit order according to the DAI(s) of DL DCI(s) for unicast. In some implementations, the UE determines the uplink resource(s), such as PUCCH resource(s), based, at least in part, on the PRI in the latest scheduling DCI among the DCIs scheduling unicast data and MC/BC data.

When there is unicast AF, the UE generates the MC/BC AF bits according to the DAI(s) of DL DCI(s) for MC/BC data (such as DCIs for MC/BC data) and appends the MC/BC AF bits to the AF codebook for unicast. The number of MC/BC ACK/NACK bits may be zero or any value. The UE uses the DAI to develop a common understanding of the MC/BC ACK/NACK bits. When there is no AF for unicast in the PUCCH, the UE transmits the MC/BC AF bit(s) using PUCCH resource(s) determined based on the PRI in the scheduling DCI for MC/BC data.

In some aspects, if there are multiple multicast services for a serving cell or for a cell-group or for a PUCCH-group, the DAI counting is performed per multicast service. For example, for a given G-RNTI, the DAI is counted from the first PDSCH to the last PDSCH in the HARQ-ACK window and across different G-RNTIs, where the DAI counts are independent of one another. In other aspects, even if there are multiple multicast services for a serving cell or for a cell-group or for a PUCCH-group, the DAI counting operation can be commonly performed across different multicast services.

Referring to FIG. 13C, the total AF bits 1364 included in the UCI and sent using PUCCH resources has both unicast AF bits and MC/BC AF bits. In some implementations, the total AF bits 1364 include an AF codebook for unicast 1370 that includes one or more bits to acknowledge unicast transmissions and an AF codebook for MC/BC 1374 that includes one or more bits to acknowledge MC/BC data transmissions.

In some implementations, the UE determines PUCCH resource(s) for MC/BC AF, such as MC/BC HARQ-ACK, based at least in part on the DCI scheduling the MB/BC data. In one example, these PUCCH resource(s) for MC/BC AF can be independent from PUCCH resource(s) for unicast AF.

In another example, the MC/BC AF and the unicast AF can share one or more PUCCH resource(s).

In some implementations, the codebook AF may be extended for the case scenario where HARQ-ACK bits for multicast data associated with different multiple multicast services are appended to the HARQ-ACK codebook for unicast data so long as there is a HARQ-ACK transmission for unicast data present. As illustrated in FIG. 13C, the multiple bits associated with respective multiple multicast services can be appended as part of MC/BC AF 1374, which follows the HARQ-ACK codebook for unicast (e.g., unicast AF 1370).

In some aspects, the appending order of HARQ-ACK bits for multiple multicast data can be based on the multicast service indexes. In particular, the multicast service indexes may be indexes that are configured for multiple multicast services and each index for corresponding multicast data can be identified by the receiving UE, where one value of G-RNTI corresponds to one multicast service. For example, multiple multicast data may be associated with different multicast services, in which the HARQ-ACK bit order can follow the multicast service indexes. If a set of multicast data is associated with the same multicast services, then the HARQ-ACK bit order may be based on time/frequency resources where the PDCCHs or PDSCHs are mapped. In some aspects, if multiple multicast data are scheduled on different time/frequency resources (or PDCCHs are detected on different time/frequency resources), the HARQ-ACK bit order can follow the time/frequency resource relationship. For example, if a set of multicast data is associated with the same time and/or frequency resources, the HARQ-ACK bit order can be based on the indexes of the associated multicast services.

In some aspects, the appending order of HARQ-ACK bits for multiple multicast data can be based on the serving cell indexes. In some aspects, the appending order of HARQ-ACK bits for multiple multicast data can be based on the timing at which PDCCHs for multiple multicast data are detected (e.g., HARQ-ACK for multicast PDSCH scheduled by an earlier detected PDCCH can be mapped earlier than the HARQ-ACK for multicast PDSCH scheduled by a later detected PDCCH). In some aspects, the appending order of HARQ-ACK bits for multiple multicast data can be based on the timing at which PDSCHs for multiple multicast data are received. In some aspects, the appending order of HARQ-ACK bits for multiple multicast data can be based on the frequency-domain position at which PDCCHs for multiple multicast data are detected or received.

Figure 14A:
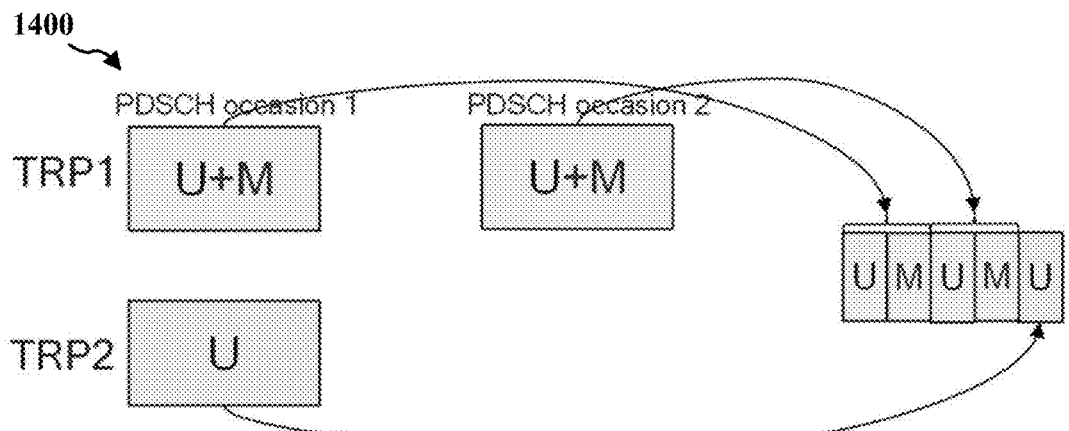
FIG. 14A is a diagram illustrating a codebook AF that maps unicast and multicast data transmissions with a first bit ordering scheme according to some implementations.
Figure 14B:
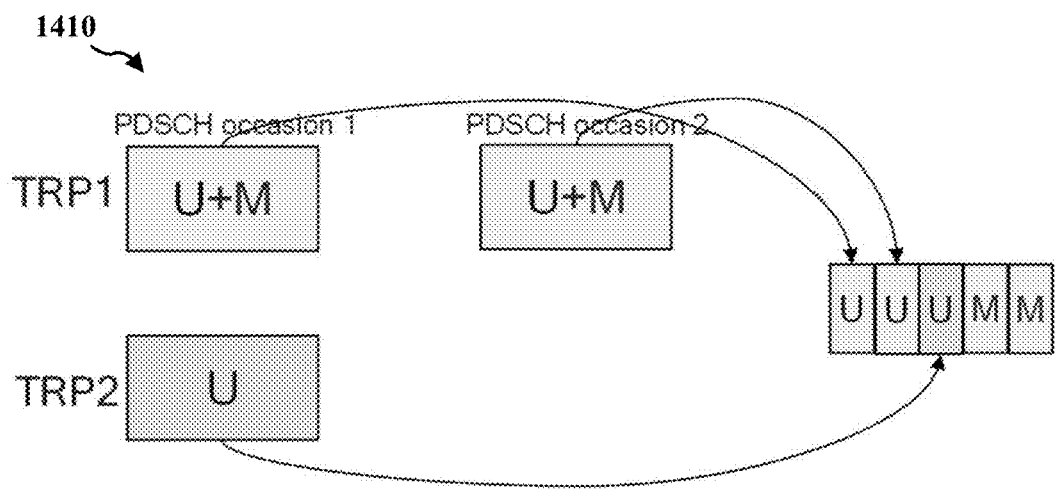
FIG. 14B is a diagram illustrating a codebook AF that maps unicast and multicast data transmissions with a first bit ordering scheme according to some implementations.
Figure 14C:
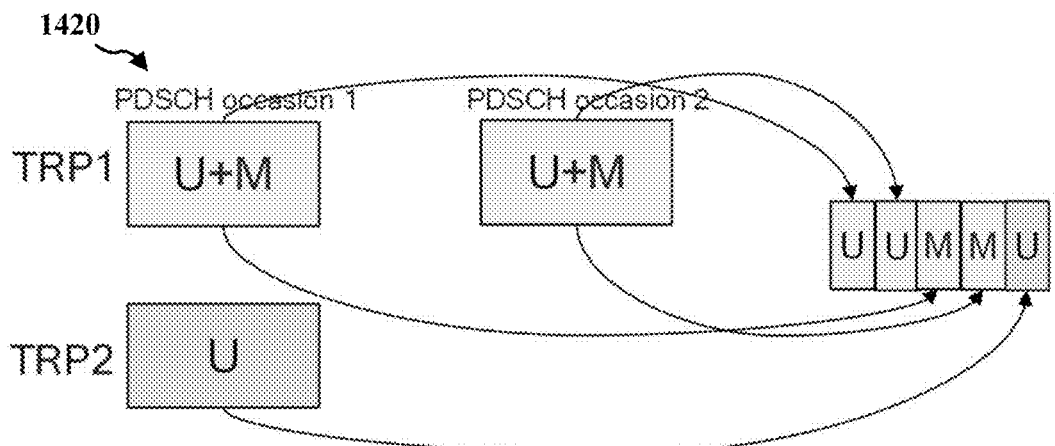
FIG. 14C is a diagram illustrating a codebook AF that maps unicast and multicast data transmissions with a first bit ordering scheme according to some implementations.

FIGS. 14A-14C are diagrams illustrating codebook AFs that map unicast and multicast data transmissions with different bit ordering schemes according to some implementations. In some implementations, the codebook AF may be extended for the case scenario where HARQ-ACK bits for multicast data associated with different multiple multicast services are appended to the HARQ-ACK codebook for unicast data so long as there is a HARQ-ACK transmission for unicast data present. For example, for a Type-1 codebook, the HARQ-ACK information bits may be concatenated by the increasing order of, but not limited to, (1) PDSCH reception occasion index at first, and then (2) serving cell index, and then (3) a CORESETPoolIndex (if configured for multiple transmission and reception point (mTRP)), and then followed by (4) X-RNTI (where C-RNTI can refer to the RNTI for unicast and G-RNTI$_N$ can refer to the RNTI for multicast with index N). In some aspects, the multicast can be appended after unicast (e.g., C-RNTI precedes G-RNTIs). As illustrated in each of FIGS. 14A-14C, a first transmission and reception point (depicted as TRP1) includes unicast data and multicast data during a first PDSCH occasion (depicted as "PDSCH occasion 1") and during a second PDSCH occasion (depicted as "PDSCH occasion 2") and a second transmission and reception point (depicted as TRP1) includes unicast data during PDSCH occasion 1.

For example, FIG. 14A is a diagram 1400 illustrating a codebook AF that maps unicast and multicast data transmissions based on a first bit ordering scheme according to some implementations. In some aspects, the first bit ordering scheme for the HARQ-ACK feedback may be concatenated by the increasing order of (1) X-RNTI, then (2) PDSCH reception occasion index, and then (3) serving cell index, and followed by (4) CORESETPoolIndex. In this regard, the codebook AF may include the unicast data corresponding to TRP1 at PDSCH occasion 1, followed by the multicast data corresponding to TRP1 at PDSCH occasion 1, followed by the unicast data corresponding to TRP1 at PDSCH occasion 2, followed by the multicast data corresponding to TRP1 at PDSCH occasion 2, then followed by the unicast data corresponding to TRP2 at PDSCH occasion 1.

FIG. 14B is a diagram 1410 illustrating a codebook AF that maps unicast and multicast data transmissions based on a second bit ordering scheme according to some implementations. In some aspects, the second bit ordering scheme for the HARQ-ACK feedback may be concatenated by the increasing order of (1) PDSCH reception occasion index, and then (2) serving cell index, followed by (3) CORESET-PoolIndex, and followed by (4) X-RNTI. In this regard, the codebook AF may include the unicast data corresponding to TRP1 at PDSCH occasion 1, followed by the unicast data corresponding to TRP1 at PDSCH occasion 2, followed by the unicast data corresponding to TRP2 at PDSCH occasion 1, followed by the multicast data corresponding to TRP1 at PDSCH occasion 1, then followed by the multicast data corresponding to TRP1 at PDSCH occasion 2.

FIG. 14C is a diagram 1420 illustrating a codebook AF that maps unicast and multicast data transmissions based on a third bit ordering scheme according to some implementations. In some aspects, the third bit ordering scheme for the HARQ-ACK feedback may be concatenated by the increasing order of (1) PDSCH reception occasion index, and then (2) serving cell index, followed by (3) X-RNTI, and followed by (4) CORESETPoolIndex. In this regard, the codebook AF may include the unicast data corresponding to TRP1 at PDSCH occasion 1, followed by the unicast data corresponding to TRP1 at PDSCH occasion 2, followed by the multicast data corresponding to TRP1 at PDSCH occasion 1, followed by the multicast data corresponding to TRP1 at PDSCH occasion 2, then followed by the unicast data corresponding to TRP2 at PDSCH occasion 1.

Figure 15:
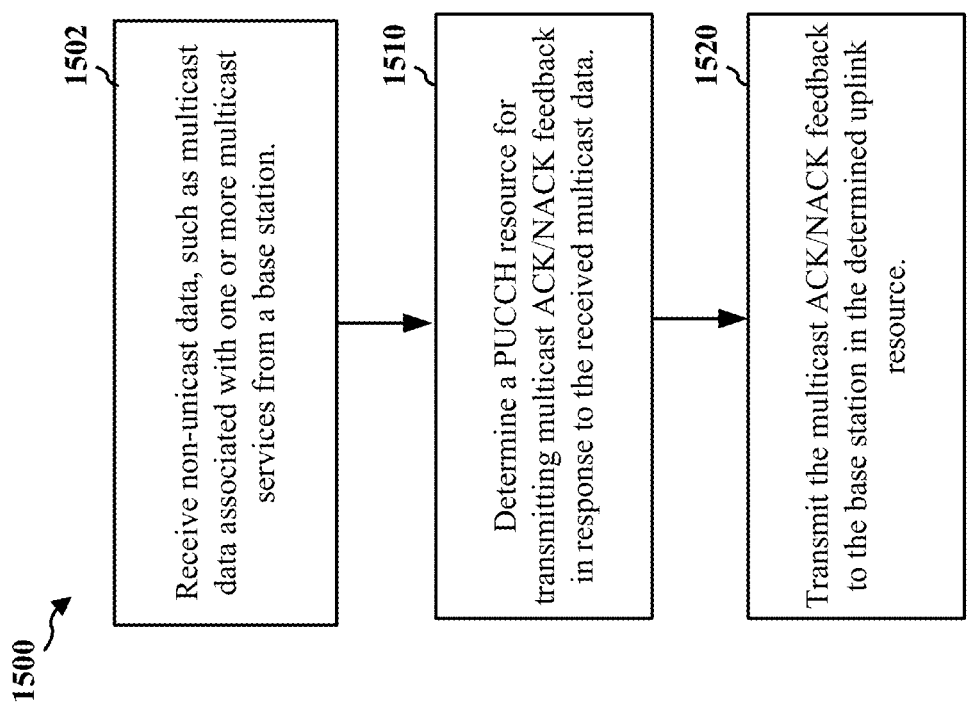
FIG. 15 is a flowchart illustrating a process for wireless communication according to some implementations.

FIG. 15 is a flowchart illustrating a process 1500 for wireless communication. The process 1500 may be performed by a UE or one or more of its components. For example, the process 1500 may be performed by the apparatus 1602 of FIG. 16, or the processing system 1714 of FIG. 17). In block 1502, the UE receives non-unicast data, such as multicast data associated with one or more multicast services from a base station. For example, the UE may receive multicast data associated with a first multicast service (e.g., Multicast A) and multicast data associated with a second multicast service (e.g., Multicast B). In block 1510, the UE determines an uplink resource, such as a PUCCH resource, for transmitting multicast AF in response to the received multicast data. The MC/BC AF can be a multicast HARQ-ACK Feedback or other multicast ACK/NACK feedback. In block 1520, the UE transmits the multicast AF to the base station in the determined uplink resource. In some implementations, the multicast AF for a particular multicast service is sent in its own slot. In another implementation, the multicast AF for a first multicast service is sent with multicast AF for a second multicast service concurrently in a single slot or across multiple slots.

Figure 16:
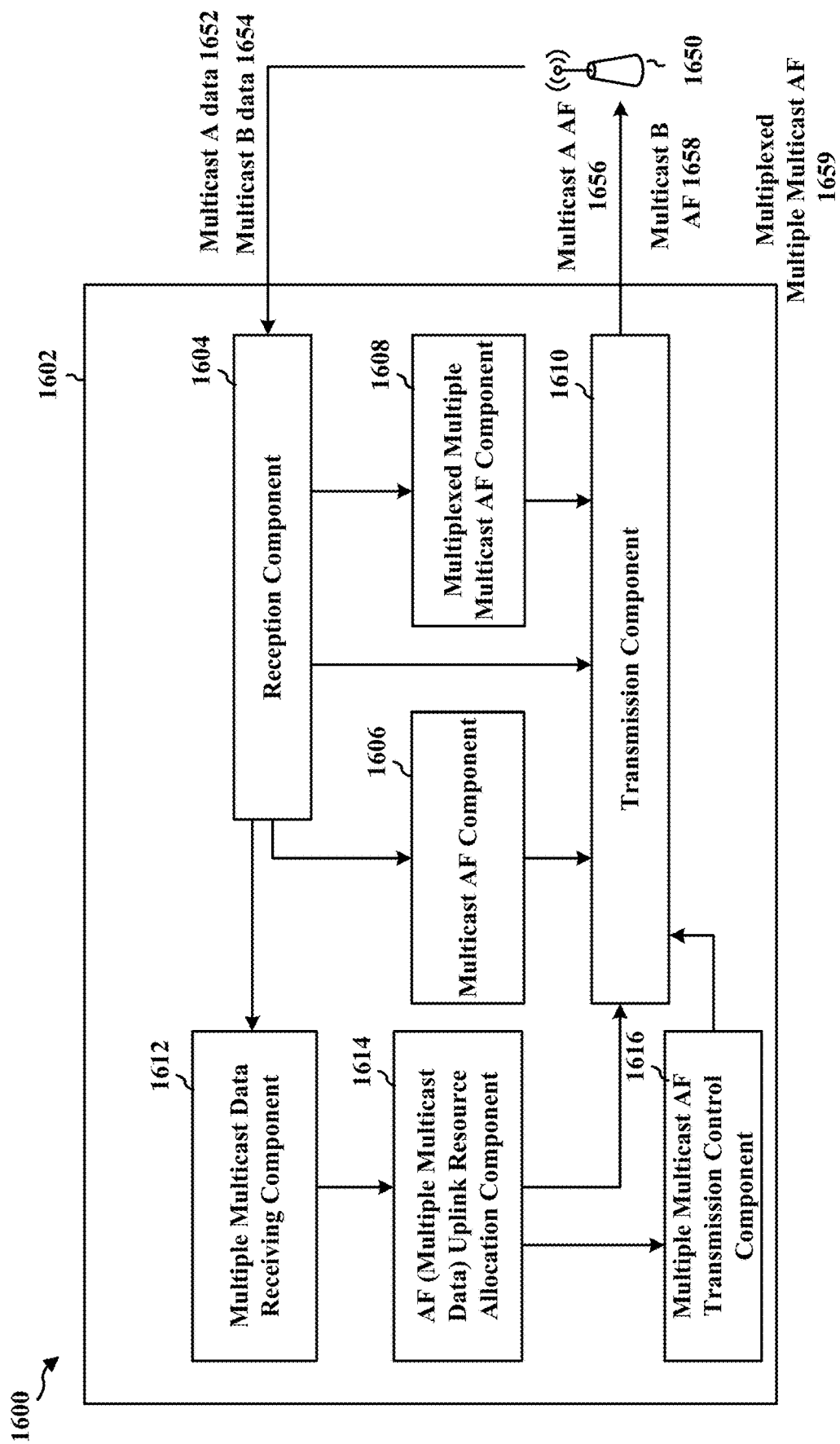
FIG. 16 is a data flow diagram illustrating the data flow between different means/components in an example apparatus.

FIG. 16 is a conceptual data flow diagram 1600 illustrating the data flow between different means/components in an example apparatus 1602. The apparatus 1602 may be a UE or one of its components (for example, a processing element and a modem). The apparatus includes a Multiple Multicast Data Receiving Component 1612 that receives data from the base station as described in connection with block 1502 of FIG. 15. The received data can be non-unicast data, such as multicast data associated with one or more multicast services, or unicast data.

The apparatus 1602 may also include an AF Uplink Resource Allocation Component 1614 that may allocate uplink resources for Multiple Multicast AF as described in connection with block 1510 of FIG. 15. The apparatus also includes an Multiple Multicast AF Transmission Control Component 1616 that may transmit Multiple Multicast AF as described in connection with block 1520 of FIG. 15. The apparatus 1602 also includes a Multicast AF Component 1606 that may allocate PUCCH resources for Multiple Multicast AF when the Multiple Multicast AF has non-shared resources and a Multiplexed Multiple Multicast AF Component 1608 that may allocate PUCCH resources for Multiple Multicast AF that share one or more resources. On downlink, the apparatus 1602 receives multicast A data 1652 and/or multicast B data 1654 from a base station 1650 via reception component 1604. On uplink, the apparatus 1602 transmits multicast A AF 1656 and/or multicast B AF 1658 to the base station 1650 via transmission component 1610. In some aspects, the apparatus 1602 can transmit multiplexed multiple multicast AF 1659 to the base station 1650.

The apparatus 1602 may include additional components that perform each of the blocks of the algorithms described with reference to the call flow 900 and process 1500 of FIGS. 9 and 15, respectively. As such, each block described with reference to FIGS. 9 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
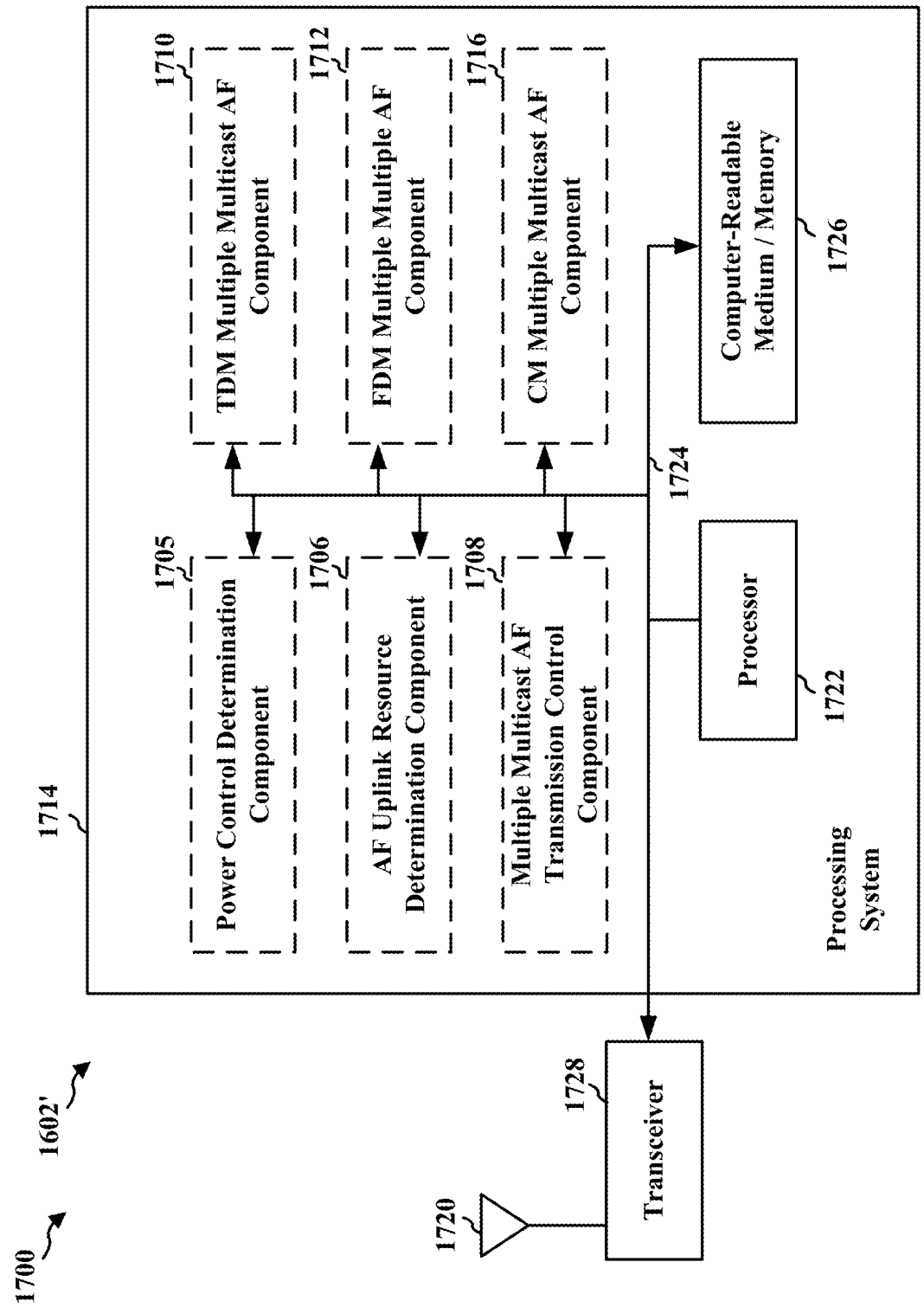
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1722, the components 1705, 1706, 1708, 1710, 1712, 1714, and the computer-readable medium/memory 1706. The bus 1724 may also link various other circuits such as timing sources, peripherals, voltage regulators, and power management circuits, which are well known in the art, and therefore, will not be described any further.

The processing system 1714 includes an AF Uplink Resource Determination Component 1706 that may determine uplink resources for acknowledging MC/BC data and unicast data. For example, AF Uplink Resource Determination Component 1706 may perform block 1510 of FIG. 15 by determining one or more PUCCH resources for transmitting multicast ACK/NACK feedback for one or more multicast services in response to received multicast data. The AF Uplink Resource Determination Component 1706 may also determine uplink resources for transmitting unicast AF in response to received unicast data. The processing system 1714 also includes a Multiple Multicast AF Transmission Control Component 1708 that may send both a first multicast AF for a first multicast service and a second multicast AF for a second multicast service over shared resources in a concurrent manner.

The processing system 1714 also includes a time division multiplexed (TDM) Multiple Multicast AF Component 1710, a FDM Multiple Multicast AF Component 1712, a codebook multiplexed (CM) Multiple Multicast AF Component 1714, and a Power Control Determination Component 1705. The TDM Multiple Multicast AF Component 1710 may send a Multiple Multicast AF over time-multiplexed shared resources. The FDM Multiple Multicast AF Component 1712 may send Multiple Multicast AF over frequency-multiplexed shared resources. In some implementations, when Multiple Multicast AF are sent over frequency-multiplexed shared resources, the Power Control Determination Component 1705 may control the power of the transmission of the FDM Multiple Multicast AF. The Power Control Determination Component 1705 may also control the transmission power for the other techniques for sending Multiple Multicast AF with dedicated resources or shared resources to the base station. The CM Multiple Multicast AF Component 1714 may send a Multiple Multicast AF over codebook-multiplexed shared resources.

The processing system 1714 may be coupled to a transceiver 1728. The transceiver 1728 is coupled to one or more antennas 1720. The transceiver 1728 provides a means for communicating with various other apparatus over a transmission medium. The transceiver 1728 receives a signal from the one or more antennas 1720, extracts information from the received signal, and provides the extracted information to the processing system 1714. In addition, the transceiver 1728 receives information from the processing system 1714, and based on the received information, generates a signal to be applied to the one or more antennas 1720. The processing system 1714 includes a processor 1722 coupled to a computer-readable medium/memory 1706. The processor 1722 is responsible for general processing, including the execution of software stored on the computer-readable medium/memory 1706. The software, when executed by the processor 1722, causes the processing system 1714 to perform the various functions described previously for any particular apparatus. The computer-readable medium/memory 1706 may also be used for storing data that is manipulated by the processor 1722 when executing software. The processing system 1714 further includes at least one of the components 1705, 1706, 1708, 1710, 1712, and 1714. The components may be software components running in the processor 1722, resident/stored in the computer readable medium/memory 1726, one or more hardware components coupled to the processor 1722, or some combination thereof.

The processing system 1714 may be a component of the UE 350 and may include the memory 360 and/or at least one of the TX processor 368, the RX processor 356, and the controller/processor 359. Alternatively, the processing system 1714 may be the entire UE (e.g., see 350 of FIG. 3).

In one configuration, the apparatus 1602' for wireless communication includes means for receiving MC/BC data from a base station. The apparatus 1602' also includes means for determining PUCCH resources for transmitting MC/BC ACK/NACK feedback in response to the received MC/BC data. The apparatus 1602' further includes means for transmitting the MC/BC ACK/NACK feedback to the base station in the determined PUCCH resource.

The aforementioned means may be one or more of the aforementioned components of the apparatus 1602' and/or the processing system 1714 of the apparatus 1602' configured to perform the functions recited by the aforementioned means. As described above, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The resource allocation techniques for uplink MC/BC AF and uplink unicast AF described herein provide mechanisms to send acknowledgement feedback of MC/BC data and unicast data to the base station. Although these techniques have been described in the context of 5G NR, these techniques may also be applicable to other multi-access technologies and the telecommunication standards that employ these technologies.

The following examples are illustrative only and may be combined with aspects of other embodiments or teachings described herein, without limitation.

Example 1 is a method of wireless communication by a wireless device at a user equipment that includes receiving multicast data associated with one or more multicast services from a base station; determining a physical uplink control channel (PUCCH) resource to transmit multicast acknowledgement (ACK)/negative acknowledgement (NACK) feedback for the one or more multicast services in response to the received multicast data; and transmitting the multicast ACK/NACK feedback to the base station in the determined PUCCH resource.

In Example 2, the method of Example 1 further includes receiving, on a physical downlink control channel (PDCCH), downlink control information (DCI) scheduling the multicast data; and determining a PUCCH resource indicator (PRI) based on the received DCI further includes that the determining the PUCCH resource comprises determining the PUCCH resource based at least in part on the PRI.

In Example 3, the method of Example 2 further includes that the determining the PUCCH resource comprises determining the PUCCH resource based, at least in part, on the PRI in a latest scheduling DCI among DCIs scheduling unicast data and the multicast data.

In Example 4, the method of Example 2 further includes receiving a control channel element (CCE) index of the PDCCH on which the multicast data is scheduled further includes that the determining the PUCCH resource comprises determining the PUCCH resource based on the CCE index of the PDCCH.

In Example 5, the method of Example 1 further includes receiving a configuration indicating the PUCCH resource for transmitting the multicast ACK/NACK feedback.

In Example 6, the method of Example 5 further includes that the configuration indicates a plurality of group radio network temporary identifiers (G-RNTIs) associated with different multicast services.

In Example 7, the method of Example 6 further includes monitoring for a group-common PDCCH comprising a cyclic redundancy check (CRC) scrambled with the plurality of G-RNTIs; detecting the group-common PDCCH with a particular G-RNTI of the plurality of G-RNTIs that is associated with a particular multicast service; and acquiring a physical downlink shared channel (PDSCH) corresponding to the particular multicast service based on the group-common PDCCH.

In Example 8, the method of Example 1 further includes that the receiving the multicast data comprises receiving first multicast data associated with a first multicast service and second multicast data associated with a second multicast service, and wherein the multicast ACK/NACK feedback is transmitted with first multicast ACK/NACK feedback corresponding to the first multicast data and second multicast ACK/NACK feedback corresponding to the second multicast data in a same set of slots of a same set of resource blocks within a subframe.

In Example 9, the method of Example 8 further includes that the first multicast ACK/NACK feedback and the second multicast ACK/NACK feedback are time division multiplexed.

In Example 10, the method of Example 8 further includes that the first multicast ACK/NACK feedback and the second multicast ACK/NACK feedback are frequency division multiplexed with a same set of consecutive symbols.

In Example 11, the method of Example 8 further includes receiving unicast data from the base station further includes that the PUCCH resource is further determined for transmitting unicast ACK/NACK feedback in response to the received unicast data, and wherein the first multicast ACK/NACK feedback and the second multicast ACK/NACK feedback are transmitted with the unicast ACK/NACK feedback in a same set of slots of a same set of resource blocks within a subframe.

In Example 12, the method of Example 11 further includes that the unicast ACK/NACK feedback is time division multiplexed with the first multicast ACK/NACK feedback and the second multicast ACK/NACK feedback.

In Example 13, the method of Example 11 further includes that the unicast ACK/NACK feedback, the first multicast ACK/NACK feedback and the second multicast ACK/NACK feedback are frequency division multiplexed with a same set of consecutive symbols.

In Example 14, the method of Example 11 further includes that the unicast ACK/NACK feedback, the first multicast ACK/NACK feedback and the second multicast ACK/NACK feedback are multiplexed in one hybrid automatic repeat request (HARQ) ACK/NACK codebook of the PUCCH resource within a slot, and wherein the first multicast ACK/NACK feedback and the second multicast ACK/NACK feedback are appended to an end of the unicast ACK/NACK feedback within the HARQ ACK/NACK codebook of the PUCCH resource.

In Example 15, the method of Example 14 further includes that the first multicast ACK/NACK feedback and the second multicast ACK/NACK feedback are appended with a predetermined order based on respective multicast service indexes of the first multicast service and the second multicast service.

In Example 16, the method of Example 14 further includes that the first multicast ACK/NACK feedback and the second multicast ACK/NACK feedback are appended with a predetermined order based on time and frequency resources on which a physical downlink shared channel (PDSCH) is received at the UE.

In Example 17, the method of Example 14 further includes that the first multicast ACK/NACK feedback and the second multicast ACK/NACK feedback are appended with a predetermined order based on time and frequency resources on which a physical downlink control channel (PDCCH) is received at the UE.

In Example 18, the method of Example 14 further includes that the first multicast ACK/NACK feedback and the second multicast ACK/NACK feedback are appended with a predetermined order based on an index of a group radio network temporary identifier (G-RNTI) that corresponds respectively to the first multicast service and the second multicast service.

In Example 19, the method of Example 14 further includes generating the multicast ACK/NACK feedback based on a downlink assignment index (DAI) of downlink control information (DCI) for the multicast data further includes that the DAI is counted for each of the first multicast service and the second multicast service; and appending the first multicast ACK/NACK feedback and the second multicast ACK/NACK feedback to the unicast ACK/NACK feedback based on the DAI.

In Example 20, the method of Example 11 further includes receiving a first configuration indicating the PUCCH resource for transmitting the multicast ACK/NACK feedback; and receiving a second configuration indicating the PUCCH resource for transmitting the unicast ACK/NACK feedback.

In Example 21, the method of Example 20 further includes that the first configuration includes PUCCH resources that are shared with the second configuration or separate from the second configuration.

Example 22 is a device including one or more processors and one or more memories in electronic communication with the one or more processors storing instructions executable by the one or more processors to cause a system or an apparatus to implement a method as in any of Examples 1 to 21.

Example 23 is a system or apparatus including means for implementing a method or realizing an apparatus as in any of Examples 1 to 21.

Example 24 is a non-transitory computer-readable medium storing instructions executable by one or more processors to cause the one or more processors to implement a method as in any of Examples 1 to 21.

Example 25 is a method of wireless communication performed by a wireless device at a user equipment that includes receiving multicast data associated with one or more multicast services from a base station; selecting a physical uplink control channel (PUCCH) resource set from a plurality of PUCCH resource sets based at least in part on a number of bits in a uplink control information (UCI), the selected PUCCH resource set comprising a plurality of PUCCH resources; selecting at least one PUCCH resource from the selected PUCCH resource set based at least in part on a PUCCH resource indicator (PRI); and transmitting multicast ACK/NACK feedback for each of the one or more multicast services to the base station in the selected at least one PUCCH resource.

Example 26 is a device including one or more processors and one or more memories in electronic communication with the one or more processors storing instructions executable by the one or more processors to cause a system or an apparatus to implement a method as in any of Examples 1 to 25.

Example 27 is a system or apparatus including means for implementing a method or realizing an apparatus as in any of Examples 1 to 25.

Example 28 is a non-transitory computer-readable medium storing instructions executable by one or more processors to cause the one or more processors to implement a method as in any of Examples 1 to 25.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a wireless device at a user equipment (UE), comprising:
   receiving multicast data associated with one or more multicast services from a base station, the multicast data including first multicast data associated with a first multicast service and second multicast data associated with a second multicast service;
   determining a physical uplink control channel (PUCCH) resource to transmit multicast acknowledgement (ACK)/negative acknowledgement (NACK) feedback for the one or more multicast services including a first PUCCH resource to transmit first multicast ACK/

NACK feedback for the first multicast service and a second PUCCH resource to transmit second multicast ACK/NACK feedback for the second multicast service in response to the received multicast data; and transmitting the multicast ACK/NACK feedback to the base station in the determined PUCCH resource, the multicast ACK/NACK feedback including the first multicast ACK/NACK feedback in the first PUCCH resource and corresponding to the first multicast data and the second multicast ACK/NACK feedback in the second PUCCH resource and corresponding to the second multicast data.

2. The method of claim 1, further comprising:
receiving, on a physical downlink control channel (PDCCH), downlink control information (DCI) scheduling the first multicast data; and
determining a PUCCH resource indicator (PRI) based on the received DCI, wherein the determining the first PUCCH resource comprises determining the first PUCCH resource based at least in part on the PRI.

3. The method of claim 2, wherein the determining the first PUCCH resource comprises determining the first PUCCH resource based, at least in part, on the PRI in a latest scheduling DCI among DCIs scheduling unicast data and the first multicast data.

4. The method of claim 2, further comprising receiving a control channel element (CCE) index of the PDCCH on which the first multicast data is scheduled, wherein the determining the PUCCH resource comprises determining the first PUCCH resource based on the CCE index of the PDCCH.

5. The method of claim 1, further comprising receiving a configuration including a first configuration indicating the first PUCCH resource for transmitting the first multicast ACK/NACK feedback and including a second configuration indicating the second PUCCH resource for transmitting the second multicast ACK/NACK feedback.

6. The method of claim 5, wherein the configuration indicates a plurality of group radio network temporary identifiers (G-RNTIs) associated with different multicast services.

7. The method of claim 6, further comprising:
monitoring for a group-common PDCCH comprising a cyclic redundancy check (CRC) scrambled with one or more of the plurality of G-RNTIs;
detecting the group-common PDCCH with a particular G-RNTI of the plurality of G-RNTIs that is associated with a particular multicast service; and
acquiring a physical downlink shared channel (PDSCH) corresponding to the particular multicast service based on the group-common PDCCH.

8. The method of claim 1, wherein the first multicast ACK/NACK feedback and the second multicast ACK/NACK feedback are transmitted in a same set of slots of a same set of resource blocks within a subframe.

9. The method of claim 8, wherein the first multicast ACK/NACK feedback and the second multicast ACK/NACK feedback are time division multiplexed.

10. The method of claim 8, wherein the first multicast ACK/NACK feedback and the second multicast ACK/NACK feedback are frequency division multiplexed with a same set of consecutive symbols.

11. The method of claim 8, further comprising receiving unicast data from the base station, wherein the PUCCH resource is further determined for transmitting unicast ACK/NACK feedback in response to the received unicast data, and wherein the first multicast ACK/NACK feedback and the second multicast ACK/NACK feedback are transmitted with the unicast ACK/NACK feedback in a same set of slots of a same set of resource blocks within a subframe.

12. The method of claim 11, wherein the unicast ACK/NACK feedback is time division multiplexed with the first multicast ACK/NACK feedback and the second multicast ACK/NACK feedback.

13. The method of claim 11, wherein the unicast ACK/NACK feedback, the first multicast ACK/NACK feedback and the second multicast ACK/NACK feedback are frequency division multiplexed with a same set of consecutive symbols.

14. The method of claim 11, wherein the unicast ACK/NACK feedback, the first multicast ACK/NACK feedback and the second multicast ACK/NACK feedback are multiplexed in one hybrid automatic repeat request (HARQ) ACK/NACK codebook of the PUCCH resource within a slot, and wherein the first multicast ACK/NACK feedback and the second multicast ACK/NACK feedback are appended to an end of the unicast ACK/NACK feedback within the HARQ ACK/NACK codebook of the PUCCH resource.

15. The method of claim 14, wherein the first multicast ACK/NACK feedback and the second multicast ACK/NACK feedback are appended with a predetermined order based on respective multicast service indexes of the first multicast service and the second multicast service.

16. The method of claim 14, wherein the first multicast ACK/NACK feedback and the second multicast ACK/NACK feedback are appended with a predetermined order based on time and frequency resources on which a physical downlink shared channel (PDSCH) is received at the UE.

17. The method of claim 14, wherein the first multicast ACK/NACK feedback and the second multicast ACK/NACK feedback are appended with a predetermined order based on time and frequency resources on which a physical downlink control channel (PDCCH) is received at the UE.

18. The method of claim 14, wherein the first multicast ACK/NACK feedback and the second multicast ACK/NACK feedback are appended with a predetermined order based on an index of a group radio network temporary identifier (G-RNTI) that corresponds respectively to the first multicast service and the second multicast service.

19. The method of claim 14, further comprising:
generating the multicast ACK/NACK feedback based on a downlink assignment index (DAI) of downlink control information (DCI) for the multicast data, wherein the DAI is counted for each of the first multicast service and the second multicast service; and
appending the first multicast ACK/NACK feedback and the second multicast ACK/NACK feedback to the unicast ACK/NACK feedback based on the DAI.

20. The method of claim 11, further comprising:
receiving a first configuration indicating the PUCCH resource for transmitting the multicast ACK/NACK feedback; and
receiving a second configuration indicating the PUCCH resource for transmitting the unicast ACK/NACK feedback.

21. The method of claim 20, wherein the first configuration includes PUCCH resources that are shared with the second configuration or separate from the second configuration.

22. An apparatus for wireless communication, comprising:
a transceiver;
at least one processor; and a memory, coupled to the transceiver and the at least one processor, storing instructions thereon, which when executed by the at least one processor, cause the apparatus to:
   receive multicast data associated with one or more multicast services from a base station, the multicast data including first multicast data associated with a first multicast service and second multicast data associated with a second multicast service;
   determine a physical uplink control channel (PUCCH) resource to transmit multicast acknowledgement (ACK)/negative acknowledgement (NACK) feedback for the one or more multicast services including a first PUCCH resource to transmit first multicast ACK/NACK feedback for the first multicast service and a second PUCCH resource to transmit second multicast ACK/NACK feedback for the second multicast service in response to the received multicast data; and
   transmit the multicast ACK/NACK feedback to the base station in the determined PUCCH resource, the multicast ACK/NACK feedback including the first multicast ACK/NACK feedback in the first PUCCH resource and corresponding to the first multicast data and the second multicast ACK/NACK feedback in the second PUCCH resource and corresponding to the second multicast data.

23. The apparatus of claim 22, wherein the instructions, which when executed by the at least one processor, further cause the apparatus to:
   receive, on a physical downlink control channel (PDCCH), via the transceiver, downlink control information (DCI) scheduling the first multicast data; and
   determine a PUCCH resource indicator (PRI) based on the received DCI, wherein the instructions, which when executed by the at least one processor, causing the apparatus to determine the first PUCCH resource further cause the apparatus to determine the first PUCCH resource based at least in part on the PRI in a latest scheduling DCI among DCIs scheduling unicast data and the first multicast data.

24. The apparatus of claim 22, wherein the instructions, which when executed by the at least one processor, further cause the apparatus to:
   receive, via the transceiver, a configuration including a first configuration indicating the first PUCCH resource for transmitting the first multicast ACK/NACK feedback and including a second configuration indicating the second PUCCH resource for transmitting the second multicast ACK/NACK feedback, wherein the configuration indicates a plurality of group radio network temporary identifiers (G-RNTIs) associated with different multicast services;
   monitor for a group-common PDCCH comprising a cyclic redundancy check (CRC) scrambled with one or more of the plurality of G-RNTIs;
   detect the group-common PDCCH with a particular G-RNTI of the plurality of G-RNTIs that is associated with a particular multicast service; and
   acquire a physical downlink shared channel (PDSCH) corresponding to the particular multicast service based on the group-common PDCCH.

25. The apparatus of claim 22, wherein the instructions, which when executed by the at least one processor, causing the apparatus to receive the multicast data further causes the apparatus to receive, via the transceiver, the first multicast data associated with the first multicast service and the second multicast data associated with the second multicast service, and wherein the first multicast ACK/NACK feedback and the second multicast ACK/NACK feedback are transmitted in a same set of slots of a same set of resource blocks within a subframe,
   wherein the instructions, which when executed by the at least one processor, further cause the apparatus to receive, via the transceiver, unicast data from the base station, wherein the PUCCH resource is further determined for transmitting unicast ACK/NACK feedback in response to the received unicast data, and wherein the first multicast ACK/NACK feedback and the second multicast ACK/NACK feedback are transmitted with the unicast ACK/NACK feedback in a same set of slots of a same set of resource blocks within a subframe.

26. The apparatus of claim 25, wherein the unicast ACK/NACK feedback, the first multicast ACK/NACK feedback and the second multicast ACK/NACK feedback are multiplexed in one hybrid automatic repeat request (HARQ) ACK/NACK codebook of the PUCCH resource within a slot, and wherein the first multicast ACK/NACK feedback and the second multicast ACK/NACK feedback are appended to an end of the unicast ACK/NACK feedback within the HARQ ACK/NACK codebook of the PUCCH resource.

27. The apparatus of claim 26, wherein the instructions, which when executed by the at least one processor, further cause the apparatus to:
   generate the multicast ACK/NACK feedback based on a downlink assignment index (DAI) of downlink control information (DCI) for the multicast data, wherein the DAI is counted for each of the first multicast service and the second multicast service; and
   append the first multicast ACK/NACK feedback and the second multicast ACK/NACK feedback to the unicast ACK/NACK feedback based on the DAI.

28. The apparatus of claim 25, wherein the instructions, which when executed by the at least one processor, further cause the apparatus to:
   receive, via the transceiver, a first configuration indicating the PUCCH resource for transmitting the multicast ACK/NACK feedback; and
   receive, via the transceiver, a second configuration indicating the PUCCH resource for transmitting the unicast ACK/NACK feedback,
   wherein the first configuration includes PUCCH resources that are shared with the second configuration or separate from the second configuration.

29. A method of wireless communication performed by a wireless device at a user equipment (UE), comprising:
   receiving multicast data associated with one or more multicast services from a base station, the multicast data including first multicast data associated with a first multicast service and second multicast data associated with a second multicast service;
   selecting a first physical uplink control channel (PUCCH) resource set to transmit first multicast acknowledgement (ACK)/negative acknowledgement (NACK) feedback for the first multicast service and a second PUCCH resource set to transmit second ACK/NACK feedback for the second multicast service from a plurality of PUCCH resource sets based at least in part on a number of bits in a uplink control information (UCI), the selected first PUCCH resource set and the selected second PUCCH resource set each comprising a plurality of PUCCH resources;

selecting at least one PUCCH resource from each of the selected first PUCCH resource set and the selected second PUCCH resource set based at least in part on a PUCCH resource indicator (PRI); and transmitting multicast ACK/NACK feedback for each of the one or more multicast services to the base station in the selected at least one PUCCH resource, the multicast ACK/NACK feedback including the first multicast ACK/NACK feedback in the selected first PUCCH resource set corresponding to the first multicast data and the second multicast ACK/NACK feedback in the selected second PUCCH resource set corresponding to the second multicast data.

30. An apparatus for wireless communication, comprising:
 a transceiver;
 at least one processor; and
 a memory, coupled to the transceiver and the at least one, storing instructions thereon, which when executed by the at least one processor, cause the apparatus to:
  receive multicast data associated with one or more multicast services from a base station, the multicast data including first multicast data associated with a first multicast service and second multicast data associated with a second multicast service;
  select a first physical uplink control channel (PUCCH) resource set to transmit first multicast acknowledgement (ACK)/negative acknowledgement (NACK) feedback for the first multicast service and a second PUCCH resource set to transmit second ACK/NACK feedback for the second multicast service from a plurality of PUCCH resource sets based at least in part on a number of bits in a uplink control information (UCI), the selected first PUCCH resource set and the selected second PUCCH resource set each comprising a plurality of PUCCH resources;
  select at least one PUCCH resource from each of the selected first PUCCH resource set and the selected second PUCCH resource set based at least in part on a PUCCH resource indicator (PRI); and
  transmit multicast ACK/NACK feedback for each of the one or more multicast services to the base station in the selected at least one PUCCH resource, the multicast ACK/NACK feedback including the first multicast ACK/NACK feedback in the selected first PUCCH resource set corresponding to the first multicast data and the second multicast ACK/NACK feedback in the selected second PUCCH resource set corresponding to the second multicast data.

* * * * *